US 11,861,750 B2

(12) United States Patent
Brophy

(10) Patent No.: US 11,861,750 B2
(45) Date of Patent: Jan. 2, 2024

(54) UNATTENDED SMART PROPERTY SHOWING

(71) Applicant: Alarm.com Incorporated, Tysons, VA (US)

(72) Inventor: Michael Montgomery Brophy, Arlington, VA (US)

(73) Assignee: Alarm.com Incorporated, Tysons, VA (US)

( * ) Notice: Subject to any disclaimer, the term of this patent is extended or adjusted under 35 U.S.C. 154(b) by 208 days.

(21) Appl. No.: 17/470,479

(22) Filed: Sep. 9, 2021

(65) Prior Publication Data

US 2021/0407023 A1 Dec. 30, 2021

Related U.S. Application Data

(63) Continuation of application No. 15/638,570, filed on Jun. 30, 2017, now Pat. No. 11,145,016.

(Continued)

(51) Int. Cl.
*G06Q 50/16* (2012.01)
*G06Q 30/0645* (2023.01)
(Continued)

(52) U.S. Cl.
CPC .......... *G06Q 50/163* (2013.01); *G06Q 10/02* (2013.01); *G06Q 30/0645* (2013.01);
(Continued)

(58) Field of Classification Search
None
See application file for complete search history.

(56) References Cited

U.S. PATENT DOCUMENTS 6,971,029 B1    11/2005  Avery, IV et al.
7,116,211 B1    10/2006  Parker
(Continued)

FOREIGN PATENT DOCUMENTS

EP    2817727 A4    10/2015
JP    3122710       6/2006
(Continued)

OTHER PUBLICATIONS

"Remotelock: Shop Cloud Access Control Products." [online] archived on May 10, 2016, available at: <https://web.archive.org/web/20160510142700/http://remotelock.com/products/remotelockacs/> (Year: 2016).*

(Continued)

*Primary Examiner* — Richard W. Crandall
(74) *Attorney, Agent, or Firm* — Fish & Richardson P.C.

(57) ABSTRACT

Rental property management technology, in which reservation data is accessed on a rental property management server, and a request from a mobile device for an upcoming reservation at a property is detected. In response to detecting the request, the rental property management server confirms the upcoming reservation based on the accessed reservation data. In response to confirming the upcoming reservation, the reservation management server generates a unique access code. The rental property management server transmits the unique access code to the mobile device and to a monitoring system on the property. The rental property management server also transmits data to the monitoring system indicating that the unique access code grants access to the property.

16 Claims, 5 Drawing Sheets

Related U.S. Application Data

(60) Provisional application No. 62/356,684, filed on Jun. 30, 2016.

(51) Int. Cl.
    *G06Q 10/02*      (2012.01)
    *G08B 25/00*      (2006.01)
    *G07C 9/00*      (2020.01)
    *G07C 9/20*      (2020.01)
    *G07C 9/27*      (2020.01)
    *G07C 9/29*      (2020.01)

(52) U.S. Cl.
CPC ..... *G07C 9/00571* (2013.01); *G07C 9/00904* (2013.01); *G07C 9/215* (2020.01); *G07C 9/27* (2020.01); *G07C 9/29* (2020.01); *G08B 25/001* (2013.01); *G07C 2009/00523* (2013.01); *G07C 2009/00753* (2013.01)

(56) References Cited

U.S. PATENT DOCUMENTS

| | | | |
|---|---|---|---|
| 7,170,998 B2 | 1/2007 | McLintock et al. | |
| 7,196,610 B2 | 3/2007 | Straumann et al. | |
| 8,437,740 B2 | 5/2013 | Despain et al. | |
| 8,902,042 B2 * | 12/2014 | Davis | G07C 9/00571 |
| | | | 340/5.1 |
| 8,957,757 B1 | 2/2015 | Le Burge et al. | |
| 9,128,471 B1 * | 9/2015 | Shahid | G06Q 30/0267 |
| 9,230,374 B1 | 1/2016 | Burge et al. | |
| 9,361,771 B2 | 6/2016 | Comerford et al. | |
| 9,514,584 B1 | 12/2016 | Burge et al. | |
| 9,710,978 B1 | 7/2017 | Sequeira et al. | |
| 9,824,559 B2 | 11/2017 | Patterson et al. | |
| 9,831,724 B2 | 11/2017 | Copeland et al. | |
| 9,996,999 B2 | 6/2018 | Conrad et al. | |
| 10,057,227 B1 | 8/2018 | Hess et al. | |
| 10,325,426 B2 | 6/2019 | Schmidt-Lackner et al. | |
| 2002/0099945 A1 | 7/2002 | McLintock et al. | |
| 2003/0151493 A1 | 8/2003 | Straumann et al. | |
| 2004/0022422 A1 | 2/2004 | Yamauchi et al. | |
| 2004/0049413 A1 | 3/2004 | Momma et a. | |
| 2004/0219903 A1 | 11/2004 | Despain et al. | |
| 2007/0096870 A1 | 5/2007 | Fisher | |
| 2007/0193834 A1 | 8/2007 | Pai et al. | |
| 2007/0290797 A1 | 12/2007 | Harkins et al. | |
| 2008/0215384 A1 | 9/2008 | Mulholland et al. | |
| 2008/0246587 A1 | 10/2008 | Fisher | |
| 2009/0024546 A1 | 1/2009 | Ficcaglia et al. | |
| 2009/0030718 A1 | 1/2009 | Bengson | |
| 2009/0266882 A1 * | 10/2009 | Sajkowsky | G07C 9/28 |
| | | | 235/380 |
| 2009/0299777 A1 | 12/2009 | Silberman | |
| 2010/0283579 A1 | 11/2010 | Kraus et al. | |
| 2011/0053557 A1 | 3/2011 | Despain et al. | |
| 2011/0082746 A1 | 4/2011 | Rice et al. | |
| 2011/0320372 A1 | 12/2011 | Woodard et al. | |
| 2012/0246024 A1 | 9/2012 | Thomas et al. | |
| 2012/0280783 A1 | 11/2012 | Gerhardt et al. | |
| 2013/0024222 A1 | 1/2013 | Dunn | |
| 2013/0059603 A1 | 3/2013 | Guenec et al. | |
| 2013/0229259 A1 | 9/2013 | Huang | |
| 2013/0347073 A1 | 12/2013 | Bryksa et al. | |
| 2014/0129113 A1 | 5/2014 | Van Wiemeersch et al. | |
| 2014/0236350 A1 * | 8/2014 | Woodard | G06Q 10/06311 |
| | | | 700/237 |
| 2014/0253285 A1 | 9/2014 | Menzel | |
| 2015/0109104 A1 | 4/2015 | Fadell et al. | |
| 2015/0129657 A1 * | 5/2015 | Rogers | G07C 9/00904 |
| | | | 235/382 |
| 2015/0193864 A1 | 7/2015 | Allison et al. | |
| 2015/0194000 A1 | 7/2015 | Schoenfelder et al. | |
| 2015/0199754 A1 | 7/2015 | Greystoke et al. | |
| 2015/0363756 A1 | 12/2015 | Zieger et al. | |
| 2016/0022375 A1 | 1/2016 | Blake et al. | |
| 2016/0034996 A1 * | 2/2016 | Min | G06Q 40/03 |
| | | | 705/26.61 |
| 2016/0048934 A1 | 2/2016 | Gross | |
| 2016/0080390 A1 | 3/2016 | Kalb et al. | |
| 2016/0163138 A1 | 6/2016 | Turner et al. | |
| 2016/0255186 A1 | 9/2016 | Kaneblai Martins Costa et al. | |
| 2016/0307380 A1 * | 10/2016 | Ho | G10L 17/00 |
| 2016/0366148 A1 | 12/2016 | Ariel et al. | |
| 2017/0193720 A1 | 7/2017 | Eyring et al. | |
| 2017/0330226 A1 | 11/2017 | Kuenzi et al. | |
| 2019/0102705 A1 | 4/2019 | Marti et al. | |
| 2019/0251771 A1 | 8/2019 | Troesch et al. | |

FOREIGN PATENT DOCUMENTS

| | | |
|---|---|---|
| WO | WO2004077848 A2 | 9/2004 |
| WO | WO2009088901 A1 | 7/2009 |
| WO | WO2014144628 A2 | 9/2014 |
| WO | WO2015123345 A1 | 8/2015 |

OTHER PUBLICATIONS

"Remotelock: Shop Cloud Access Control Products." [online] archived on May 10, 2016, available at: <https://web.archive.org/web/20160510142700/http://remotelock.com/products/remote lockacs/>.*

"The Evolution of Home Security Systems," Protect Your Home Blog, [online], published on Mar. 31, 2014, available at: <https://www.protectyourhorne.corn/blog/horne-security-equiprnent/the- evo-lution-of-horne-security-systerns>.

Exp Realty Open House App, archived on Mar. 4, 2016, available at: <https://web.archive.org/web/20160304045557/https://expcloud.com/exp-realty-openhouse-app/>.

* cited by examiner

UNATTENDED SMART PROPERTY SHOWING

CROSS-REFERENCE TO RELATED APPLICATIONS

This application is a continuation of U.S. application Ser. No. 15/638,570, filed Jun. 20, 2017, now allowed, which claims the benefit of U.S. Provisional Application No. 62/356,684, filed Jun. 30, 2016. The complete disclosures of all of the above patent applications are hereby incorporated by reference in their entirety for all purposes.

TECHNICAL FIELD

This disclosure application relates generally to rental property management technology.

BACKGROUND

When a property is for sale or is available for rent, prospective residents may need to wait for an open house to see the inside of the home. Alternatively, prospective residents may need to contact a realtor, owner, or property manager that has access to a physical key to unlock the property and that person may need to go with the prospective residents to the property to unlock the property.

SUMMARY

Techniques are described for rental property management technology. For example, techniques are described for allowing tenants or prospective buyers or renters to tour properties without the presence of an owner, property manager, or real estate agent.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DETAILED DESCRIPTION

Techniques are described for allowing tenants to tour properties without the presence of an owner, real estate agent, or property manager. A system uses tenant reservation data to automatically show rental properties to prospective tenants, including providing access codes and monitoring the rental properties in accordance with tenant reservations and check-ins/check-outs.

Once a prospective tenant, or user of the system, has toured the property, he can provide feedback to the system regarding his experience. For example, the user can provide feedback about what aspects of the current property he liked and what aspects of the current property he did not like. This feedback allows the owner, real estate agent, or property manager to maintain a relationship with the prospective tenant, and if the current property he is viewing does not fit his needs, the owner, real estate agent, or property manager can help the prospective tenant find a property that does.

The renting process is streamlined by providing a system through which a prospective tenant can reserve showing times, access properties, and indicate interest. Whereas prospective tenants may have previously been limited to times during which leasing agents, property managers, etc. were available, they can now view properties at times that fit their schedules. Allowing prospective tenants to view properties unattended minimizes the amount of time a property is vacant, and reduces travel and labor costs for property management companies with properties that are geographically distant. In some examples, unattended viewing may include allowing tenants to view properties unaccompanied by an owner or property manager. For example, if a property management company focuses on long term renters and has a portfolio of single family homes that are each at least 20 twenty miles apart from each other or the property management company site, the property management company can increase the frequency of showings without incurring additional travel costs or losing time between showings by travelling between the different properties.

Furthermore, multiple interested parties can attend showings simultaneously while receiving a personalized experience, and showing times may overlap without interrupting the viewing experience of a prospective tenant already inside the property. For example, if a prospective tenant, John, is interested in viewing a property from 1:30 p.m. to 2:30 p.m., and a second prospective tenant, Sally, is interested in viewing the same property from 2:00 p.m. to 2:30 p.m., the system may enable both John and Sally to view the property during their desired viewing times. Additionally, the system may provide a guided tour or personalized information for John and for Sally.

Figure 1:
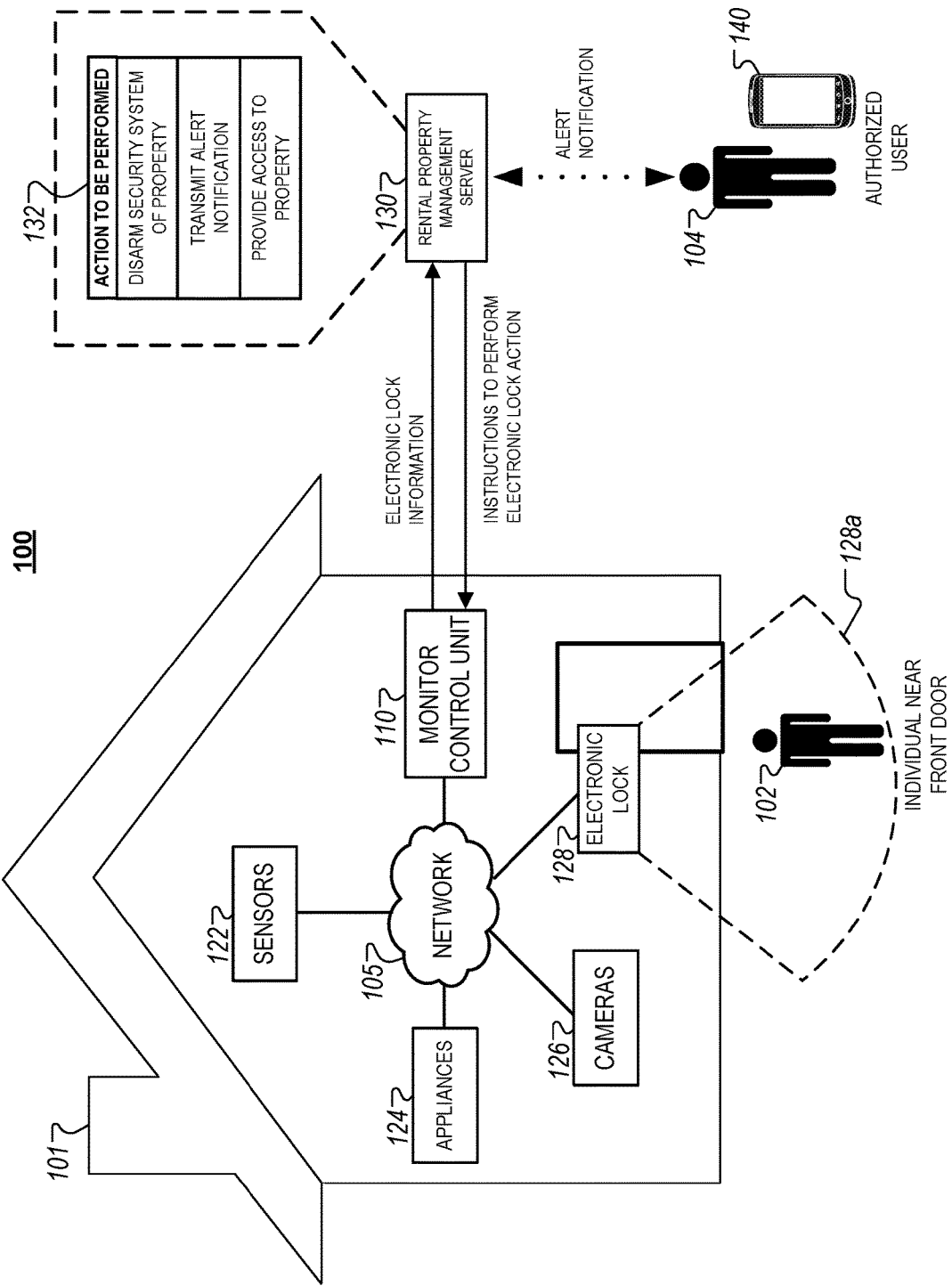
FIG. 1 illustrates a diagram of an example of a system that enables unattended property showing.

FIG. 1 illustrates a diagram of an example of a property management system 100 associated with a property 101. While the below disclosure is written in the context of showing a rental property it could also be used for showing a property for sale. In some examples, the system can be used to provide access codes to prospective tenants who wish to tour the property. The system 100 may include a monitor control unit 110, sensors 122, appliances 124, cameras 126, an electronic lock 128, a rental property management server 130 that manages rental reservations, and an authorized user device 140. The server 130 may maintain data that defines which prospective tenants, owners, or property managers are associated with which properties (or the electronic locks at the properties) and maintain permission data that sets which users are allowed to view data and perform control operations for electronic locks and monitoring and energy consuming devices.

Although FIG. 1 illustrates one property for brevity, the server 120 may manage electronic locks and energy consuming devices for many more properties and/or structures. For example, the system 100 may include several monitoring systems each associated with a respective multiple, different rental properties and the server 120 may manage access to all the multiple, different rental properties. The multiple, different properties may be operated by different entities (e.g., owned by different entities) with single entities operating groups of properties. For example, each rental property may be owned by a different person, and a single property management company may be managing all of the rental properties using the system. The authorized user 104 may be the same user as the individual near the front door 102. For example, the individual near the front door 102 may be authorized to gain access to the property 101 and may be entering an access code to the electronic lock 128.

The operations performed by the system 100 may limit labor and travel expenses by automating the process of granting access to prospective tenants in remotely located rental properties. In some examples, the server 130 receives data related to reservations for the rental properties managed by the server 130. The server 130 may provide a web interface that enables users (e.g., travel agents, travelers, property management personnel, etc.) to manage reservations for the rental properties (e.g., make reservations, cancel reservations, change reservations, etc.). In these implementations, the server 130 further receives data related to settings for monitoring systems, devices, and energy management provided by owners and/or property managers of the rental properties managed by the server 130.

The server 130 may provide a web interface that enables each owner and/or property manager to define operational settings for their rental properties (e.g., energy management profiles, thermostat profiles, lighting management profiles, rules related to interior door access by renters for rented and unrented states of the property, etc.). In some examples, the owner or property manager may define and update settings for appliances, devices, and systems of the property 101. In some examples, a tenant or a prospective tenant may make changes to settings and profiles for appliances, devices, and systems of the property 101.

In general, the system 100 can be configured to respond to an electronic lock action by an individual 102 based on monitoring an detectable region 128a of the property 101 and determining an appropriate action to be performed in response based on one or more actions specified by a lock action repository 132. The lock action repository 132 may include actions available in response to inputs to the electronic lock 128. For example, in response to the electronic lock 128 detecting an input of an incorrect access code, the lock action repository 132 may transmit a control signal to the monitor control unit 110 to active an alarm. The lock action repository 132 may receive data from the electronic lock 128. In some examples, the lock action repository 132 may communicate with various systems, such as the monitor control unit 110, the server 130, etc. In the example depicted in FIG. 1, the electronic lock 128 initially detects an input to the electronic lock 128 by the individual 102. In response to detecting user input, the electronic lock 128 monitors the detectable region 128a, near the front door of the property 101, for motion by the individual 102. The electronic lock 128 then transmits a signal including lock information (e.g., timestamp of input to the electronic lock, detected motion within the detectable region 128a, captured footage of the individual 102, etc.) to the monitor control unit 110. In response, the monitor control unit 110 gathers additional information for the property 101 from the sensors 122, the appliances 124, and the cameras 126, and then transmits the gathered data to the rental property management server 130.

After receiving the gathered data, the rental property management server 130 accesses the lock action repository 132 to determine an appropriate action to be performed based on the information included within the gathered data. After determining an appropriate action to be performed, the rental property management server 130 transmits instructions to perform the action to be performed to the monitor control unit 110, which then transmits corresponding signals to one or more of the sensors 122, the appliances 124, the cameras 126, or the electronic lock 128. In some instances, the action to be performed may include transmitting an electronic lock alert notification indicating the detected input to the electronic lock and other associated information to the user device 140 of the authorized user 104. More particular descriptions related to the components of the system 100 are provided below.

The server 130 may maintain a database that stores integrated reservation data and property usage data (e.g., lock/lock usage data, thermostat usage data, and pool heater usage data). In some examples, the server 130 or the monitor control unit 110 maintains the property usage data. The server 130 may analyze the integrated reservation data and property usage data to provide alerts/reports based on both reservation data and property usage data and also to verify that the property 101 is being properly managed. For example, the server 130 may monitor sensors on interior doors to which a renter does not have access to issue an alert to a property manager or owner of the property 101. The server 130 also enables owners or property managers of the properties to edit operational settings at the properties. In some examples, the server 130 manages operational settings at the properties in an automated manner based on the reservation data and the property usage data stored in the server 130.

The server 130 may communicate with the monitor control unit 110 to control operations of devices and systems located on the property 101. For example, when allowing users to view the property 101 unattended, systems such as the HVAC system may be locked. The server 130 may control the HVAC system and/or deny input from a thermostat located on the property 101. For example, the owner or property manager of the property 101 may set controls of the HVAC system such that the settings cannot be changed during unattended viewing times. In some examples, the visitors or prospective tenants may not interact with the devices and systems of the property 101. For example, the owner of the property may set operational settings for the devices and systems of the property 101 such that the devices and systems do not respond to physical inputs, e.g., a visitor or prospective tenant may press buttons or flip switches and no action will be taken. In some examples, prospective tenants may interact with physical controls in the property 101. For example, prospective tenants may interact with light switches, open cabinets and doors, turn fans on and off, etc.

In some examples, the owner or property manager may set controls of devices or systems such that they do not accept input when occupancy is detected. The system 100 may enable the owner or property manager to set controls of devices or systems by sending control signals through the monitor control unit 110. For example, the system 100 may send control signals to a security system to enable it through the monitor control unit 110. In some examples, the system 100 may enable the owner or property manager to set controls of devices or systems by directly controlling the devices or systems. For example, the system 100 may communicate directly with an electronic lock to grant a prospective tenant access to a property.

In some examples, the systems and devices may be locked when it is detected that a prospective tenant is in the home, but settings may be adjusted remotely. In some examples, settings may be adjusted remotely at any time, and may not be adjusted manually. For example, if the owner or property management company is managing the property 101 remotely, they may not allow control of systems or devices located on the property 101 by anyone.

The system 100 also includes electronic locks located at each of the properties. As shown, the property 101 includes an electronic lock 128 located at an exterior door of the property 101 and a monitor control unit 110 located within the property 101. The electronic lock 128 may include a user input device that receives user input of a passcode and a mechanical lock that unlocks and locks a physical door of an entrance to the property 101. The electronic lock 128 also may include a communication module that performs two-way communication over a wired or short-range wireless communication protocol and a processor that controls the lock to allow access to the property based on entry of a proper passcode through the user input device.

In some examples, the electronic locks described throughout this disclosure may have firmware and processing capabilities that allow the server 130 to add, delete, and change codes stored at the electronic locks. The electronic lock 128 engages in two-way communications with the monitor control unit 110 over the short-range wireless communication protocol. In this example, the monitor control unit 110 includes communication components that allow the monitor control unit 110 to perform two-way communication with the lock 128 over the short-range wireless communication protocol and to perform two-way communication with the server 130 over a long-range communication protocol (e.g., a long-range wired or wireless communication protocol). The monitoring system 110 may serve as an intermediary between the server 130 and the lock 128 to enable the server 130 to remotely program and manage the lock 128 and also to receive reports when events (e.g., entry of a correct passcode, entry of an incorrect passcode, entry of a check-in or checkout code, etc.) occur at the lock 128.

In some examples, the monitor control unit 110 performs relatively few processing operations and serves to primarily exchange communications between the lock 128 and the server 130. In these examples, the lock 128 includes an electronic storage device that stores passcodes that are valid to open the lock 128 and the processor of the lock 128 performs the decision making processing to determine whether or not a proper passcode has been entered. When the server 130 remotely manages passcodes (e.g., adds passcodes, deletes passcodes, changes passcodes, etc.) for the lock 128, the monitor control unit 110 relays commands from the server 130 to the lock 128 and the processor of the lock 128 interprets the commands and performs adjustments to the electronic storage device needed to modify the valid passcodes as instructed. For reporting lock events, the lock 128 sends reports of events to the monitor control unit 110 and the monitor control unit 110 relays the reports to the server 130. The server 130 stores the reports and may perform reporting operations for the entity operating the property 101 such that the entity (e.g., owner) may be alerted to events at the lock 128 and may view a history of events at the lock 128. The server 130 also may perform energy management operations for the property 101 based on reports from the lock 128.

In other examples, the lock 128 performs relatively few processing operations and the monitor control unit 110 performs control processing for the lock 128. In these examples, the monitor control unit 110 includes an electronic storage device that stores passcodes that are valid to open the lock 128 and also includes a processor that performs the decision making processing to determine whether or not a proper passcode has been entered. For instance, when a user inputs a passcode at the lock 128, the lock 128 merely forwards the entered passcode to the monitor control unit 110 and the monitor control unit 110 determines whether the passcode is valid. Based on the determination, the monitor control unit 110 sends a command back to the lock 128 to either deny the entered passcode or allow access to the property 101. When the server 130 remotely manages passcodes (e.g., adds passcodes, deletes passcodes, changes passcodes, etc.) for the lock 128, the monitor control unit 110 interprets the commands and performs adjustments to the electronic storage device needed to modify the valid passcodes as instructed. The lock 128 does not need to receive any communication related to the management of passcodes since the monitor control unit 110 stores the valid passcodes. For reporting lock events, the monitor control unit 110 sends reports of events to the server 130. The server 130 stores the reports and may perform reporting operations for the entity operating the property 101 such that the entity (e.g., owner) may be alerted to events at the lock 128 and may view a history of events at the lock 128. In some examples, the server 130 also may perform energy management operations or other operations of monitoring or energy consuming devices for the property 101 based on reports from the monitor control unit 110.

The monitor control unit 110 includes a controller and a network module. The controller is configured to control a monitoring system (e.g., a home alarm or security system) that includes the monitor control unit 110. In some examples, the controller may include a processor or other control circuitry configured to execute instructions of a program that controls operation of an alarm system. In these examples, the controller may be configured to receive input from sensors, detectors, or other devices included in the alarm system and control operations of devices included in the alarm system or other household devices (e.g., a thermostat, an appliance, lights, etc.). For example, the controller may be configured to control operation of the network module included in the monitor control unit 110.

The network module is a communication device configured to exchange communications over the network 105. The network module may be a wireless communication module configured to exchange wireless communications over the network 105. For example, the network module may be a wireless communication device configured to exchange communications over a wireless data channel and a wireless voice channel. In this example, the network module may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module may also be a wired communication module configured to exchange communications over the network 105 using a wired connection. For instance, the network module may be a modem, a network interface card, or another type of network interface device. The network module may be an Ethernet network card configured to enable the monitor control unit 110 to communicate over a local area network and/or the Internet. The network module also may be a voice-band modem configured to enable the alarm panel to communicate over the telephone lines of Plain Old Telephone Systems (POTS).

The network 105 is configured to enable exchange of electronic communications between devices connected to the network 105. For example, the network 105 may be configured to enable exchange of electronic communications between the monitor control unit 110, the sensors 122, the appliances 124, the cameras 126, the electronic lock 128 and the rental property management server 130. The network 105 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. The network 105 may include multiple networks or subnetworks, each of which may include, for example, a wired or wireless data pathway. The network 105 may also include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may be a wireless network, a broadband network, or a combination of networks including a wireless network and a broadband network.

In some examples, the monitor control unit 110 may include data capture and recording devices. In these examples, the monitor control unit 110 may include one or more cameras 126, one or more motion sensors, one or more microphones, one or more biometric data collection tools, one or more temperature sensors, one or more humidity sensors, one or more air flow sensors, and/or any other types of sensors that may be useful in capturing monitoring data related to the property 101 and users in the property.

The property 101 may include various monitoring devices. For example, the property 101 may include cameras, sensors, and other devices that provide monitoring data associated with devices and areas of the property 101. Cameras located on the property 101 may provide video, still images, or other monitoring data, and may provide data via a live feed, transmit data to be stored in a remote location, store data locally for review at a later time, etc. Sensors located on the property 101 may include motion sensors, heat sensors, pressure sensors, resistive sensors, etc. Sensors may communicate with the monitor control unit 110 and transmit monitoring data for processing to the monitor control unit 110. In some examples, sensors located on the property 101 may store collected data locally or transmit monitoring data to be stored in a remote location.

In some examples, the monitor control unit 110 includes computer-readable storage media that store passcodes that are valid to open the lock 128. The lock 128 may transmit input received at a keypad or other user input device to the monitor control unit 110. The monitor control unit 110 may determine whether a proper passcode has been entered or the processor of the lock 128 performs the decision making processing to determine whether or not a proper passcode has been entered. When the server 130 remotely manages passcodes (e.g., adds passcodes, deletes passcodes, changes passcodes, etc.) for the lock 128, the monitor control unit 110 relays commands from the server 130 to the lock 128 and the processor of the lock 128 interprets the commands and performs adjustments to the electronic storage device needed to modify the valid passcodes as instructed. For reporting lock events, the lock 128 sends reports of events to the monitor control unit 110 and the monitor control unit 110 relays the reports to the server 130. The server 130 stores the reports and may perform reporting operations for the entity operating the property 101 such that the entity (e.g., owner) may be alerted to events at the lock 128 and may view a history of events at the lock 128. The server 130 also may perform energy management operations for the property 101 based on reports from the lock 128.

In some examples, the monitor control unit 110 performs relatively few processing operations and serves to primarily exchange communications between the lock 128 and the server 130. In these examples, the lock 128 includes an electronic storage device that stores passcodes that are valid to open the lock 128 and the processor of the lock 128 performs the decision making processing to determine whether or not a proper passcode has been entered. When the server 130 remotely manages passcodes (e.g., adds passcodes, deletes passcodes, changes passcodes, etc.) for the lock 128, the monitor control unit 110 relays commands from the server 130 to the lock 128 and the processor of the lock 128 interprets the commands and performs adjustments to the electronic storage device needed to modify the valid passcodes as instructed. For reporting lock events, the lock 128 sends reports of events to the monitor control unit 110 and the monitor control unit 110 relays the reports to the server 130. The server 130 stores the reports and may perform reporting operations for the entity operating the property 101 such that the entity (e.g., owner) may be alerted to events at the lock 128 and may view a history of events at the lock 128. The server 130 also may perform energy management operations for the property 101 based on reports from the lock 128.

The monitor control unit 110 also may include a communication module that enables the monitor control unit 110 to communicate other devices of the system 100. The communication module may be a wireless communication module that allows the monitor control unit 110 to communicate wirelessly. For instance, the communication module may be a Wi-Fi module that enables the monitor control unit 110 to communicate over a local wireless network at the property 101. The communication module further may be a 900 MHz wireless communication module that enables the monitor control unit 110 to communicate directly with a monitor control unit. Other types of short-range wireless communication protocols, such as Bluetooth, Bluetooth LE, Zwave, ZigBee, etc., may be used to allow the monitor control unit 110 to communicate with other devices in the property 101.

The monitor control unit 110 further may include processor and storage capabilities. The monitor control unit 110 may include any suitable processing devices that enable the monitor control unit 110 to operate applications and perform the actions described throughout this disclosure. In addition, the monitor control unit 110 may include solid state electronic storage that enables the monitor control unit 110 to store applications, configuration data, collected sensor data, and/or any other type of information available to the monitor control unit 110.

The monitor control unit 110 may exchange communications with the sensors 122, the appliances 124, the cameras 126, the electronic lock 128, and the rental property management server 130 using multiple communication links. The multiple communication links may be a wired or wireless data pathway configured to transmit signals from sensors 122, the appliances 124, the cameras 126, the electronic lock 128, and the rental property management server 130 to the controller. The sensors 122, the appliances 124, the cameras 126, the electronic lock 128, and the rental property management server 130 may continuously transmit sensed values to the controller, periodically transmit sensed values to the monitor control unit 110, or transmit sensed values to the monitor control unit 110 in response to a change in a sensed value.

The multiple communication links may include a local network. The sensors 122, the appliances 124, the cameras 126, the electronic lock 128, and the rental property management server 130 and the monitor control unit 110 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

In some implementations, the monitor control unit 110 may additionally be used to perform routine surveillance operations on a property. For instance, the monitor control unit 110 may be assigned to one or more particular properties within a geographic location and may routinely collect surveillance footage during specified time periods (e.g., after dark), which may then be transmitted to the rental property management server 130 for transmitting back to each particular property owner. In such implementations, the property owner may receive the surveillance footage over the network 105 as a part of a service provided by a security provider that operates the rental property management server 130. For example, transmissions of the surveillance footage collected by the monitor control unit 110 may be part of a premium security service package provided by a security provider in addition to the routine drone emergency response service.

In some implementations, the monitor control unit 110 may monitor the operation of the electronic devices of the system 100 such as sensors 122, the appliances 124, the cameras 126, the electronic lock 128, and the rental property management server 130. For instance, the monitor control unit 110 may enable or disable the devices of the system 100 based on a set of rules associated with energy consumption, user-specified settings, and/or other information associated with the conditions near or within the property 101 where the system 100 is located. In some examples, the monitor control unit 110 may be used as a replacement to a traditional security panel (or monitor control unit) that is used to monitor and control the operations of the system 100. In other examples, the monitor control unit 110 may coordinate monitoring operations with a separate security panel of the system 100. In such examples, the monitor control unit 110 may monitor particular activities of the devices of the system 100 that are not monitored by the security panel, or monitor the operation of particular devices that are not monitoring by the security panel.

In some examples, a monitoring system may not be used. In these examples, the locks may communicate directly with the server 130 over a long-range communication protocol.

In controlling operations of the property 101, the server 130 may consider reservation data for the rental property and/or events detected by an electronic lock, monitoring system devices, sensors, etc. at the rental property. For instance, the server 130 may define the prospective tenant arrival time used in determining when to begin arrival preparation as the earliest possible check-in time allowed with the reservation or the time when the prospective tenant reaches the rental property and enters a check-in code to the electronic lock at the property. In some implementations, the server 130 tracks actual check-in times detected by the lock at the property over time (e.g., many rental periods) and determines an estimated arrival time based on the tracked check-in times. In these implementations, the server 130 may compute an average or median actual check-in time at the rental property based on the tracked check-in times and use the computed average or median actual check-in time as the estimated arrival time.

In addition, the server 130 may use a combination of the reservation data and the electronic lock data in managing energy usage at the rental property. For example, the server 130 may begin arrival preparation based on the earliest possible check-in time allowed with the reservation and then monitor for an event from the electronic lock that signifies that the prospective tenant has arrived at the property. The server 130 may use monitoring data, such as camera input (still images or video), motion sensors, etc. to determine whether the prospective tenant has arrived at the property. In this example, the server 130 may maintain operational settings for an occupied rental property based on the server 130 detecting the event from the electronic lock that signifies that the prospective tenant has arrived at the property within a threshold period of time after the earliest possible check-in time allowed with the reservation. However, based on the server 130 determining that the event from the electronic lock that signifies that the prospective tenant has arrived at the property has not been detected within the threshold period of time, the server 130 may initiate conservation or un-occupancy operations (e.g., at least temporarily stopping heating or cooling of the rental property, turning off lights, etc.) and continue monitoring for an event from the electronic lock or monitoring system devices that signifies that the prospective tenant has arrived at the property. The server 130 also may take action to attempt to determine when the prospective tenant expects to arrive at the rental property (e.g., sending the prospective tenant an electronic message that asks the prospective tenant to provide an estimated arrival time).

In some implementations, the server 130 also sets a "departure" profile. In these implementations, the server 130 may use the prospective tenant reservation data (e.g., check out date/time) and may send a signal to the monitoring system that includes settings for the departure of the prospective tenant. The monitoring system at the property then may send the departure settings to various devices and systems located in the rental property 101. The departure operations and timing of when the departure temperature is used may be set by the rental management company and/or the owner of the rental property in a manner similar to that described above for the arrival temperature.

The server 130 may use reservation data and/or electronic lock events to control departure timing similar to how the server 130 uses reservation data and/or electronic lock events to control arrival timing. For instance, the server 130 may monitor for a departure code that the prospective tenant is asked to enter at the lock when checking out. In some examples, the departure code may operate the electronic lock 128. In some examples, the departure code does not operate the electronic lock 128, but is used to report the check-out to the server 130, which in turn is able to perform energy management operations defined for when the rental property is not occupied by a prospective tenant. To the extent the server 130 does not detect the departure code by the latest check-out time allowed with the reservation, the server 130 may, at that time, initiate operations defined for when the rental property is not occupied by a prospective tenant or may provide reminder to the prospective tenant that their reserved time has elapsed, e.g., flash the lights in the property, provide an announcement of speakers in the property that the reserved time has elapsed, etc.

The server 130 may initiate operations defined for when the property is not occupied if no activity or motion is detected for a predetermined amount of time, even if no departure is detected. For example, a visitor may depart without fully closing the front door, through the back door, without entering a departure code, etc. In such examples, the server 130 may use monitoring data to determine that all visitors have departed and initiate operations for an unoccupied property.

In some examples, the server 130 may determine that the property 101 is unoccupied through data such as a visitor's geographical location, which devices are connected to a network of the property 101, etc. For example, if no devices are connected to the network local to the property 101 and all visitors' geographical locations are determined to be locations other than the property 101, the server 130 may determine that the property 101 is unoccupied, and enter an unoccupied operation mode.

In some examples, the server 130 stores reservation information (e.g., periods in which properties are rented, arrival date-time, departure date-time, etc.) for each property being managed by the server 130. At a particular number of hours prior to the prospective tenant arrival, the server 130 may send a signal via a network (e.g., the Internet) to the monitor control unit 110 in the rental property 101. The signal may include a prospective tenant arrival temperature setting, a lighting system profile, a personalized greeting, etc., and the monitor control unit 110 may then send the prospective tenant arrival settings to the appropriate devices (e.g., a thermostat, lights, a speaker system, etc.) located in the rental property 101.

The particular number of hours prior to the prospective tenant arrival at which arrival preparation begins and the prospective tenant arrival settings may be set by the owner of the property or the rental management company that operates the server 130. The rental management company may define limits in which the owner of the property can choose the desired number of hours and the prospective tenant arrival settings to prevent owners from choosing unreasonable settings that are likely to result in prospective tenant dissatisfaction.

The prospective tenant also may set the particular number of hours prior to the prospective tenant arrival at which arrival preparation begins and adjust the prospective tenant arrival settings. The owner of the property and/or the rental management company may define limits in which the prospective tenant can choose the desired number of hours and the prospective tenant arrival settings to prevent prospective tenants from choosing unreasonable settings that are likely to result in high energy consumption.

A user of a mobile device 140 may be interested in the property 101. The user may make a reservation to see the property 101 through a mobile application on the mobile device 140 (e.g., an application for interacting with the server 130). The user may make a reservation to see the property 101 through a web interface (e.g., a property management company's website). In some examples, a mobile application on the mobile device 140 may allow the user to browse properties on one or more property management company websites. For example, the mobile application may present the user with a list of properties from different property management companies, and redirect the user to the property management company's web site once the user selects a property to view. The mobile application may allow a user to filter results by location, price, availability, showing times, management company, etc.

In this example, the user may decide that they are interested in viewing the property 101. The user may select the property 101 using the mobile application and indicate their interest using a user interface element provided in the mobile application (e.g., a "Reserve a Showing" button). The mobile application may display a list of times during which the property 101 is available for viewing. For example, the property 101 may still have a tenant who wishes to be home when prospective tenants view the property 101; the application may offer only times during which they are home to prospective tenants. In some examples, the owner or property manager may override tenant-specified viewing times. In some examples, the owner or property manager may set the viewing times without input from the current tenant. The available viewing times can include the present—for example, a prospective tenant may be in the neighborhood and may wish to view the property at that very moment.

The user can select a time or range of times to view the property. For example, viewings may be a fixed amount of time (e.g., thirty minutes, one hour, two hours, etc.). In some examples, the user can select a range of times, (e.g., from 2 p.m. to 3:45 p.m.). The user may be able to select a range of times in various increments (e.g., fifteen minutes, thirty minutes, forty-five minutes, etc.). In some examples, the user is limited to increments or time ranges set by the owner or property manager of the property. For example, the owner may impose a time limit of one and a half hours for each prospective tenant to view the property. In some examples, the property manager may override the owner's limits if the limits would negatively impact a prospective tenant's experience. In other examples, the owner may override the property manager's limits if the owner is not comfortable with them.

Once the user has selected a property and a reservation time, the user may be asked to register. For security and authentication purposes, the user may be asked to answer a variety of questions and provide various information. The user may be asked to provide their full name, email address or phone number, and notification preferences. For example, the property management company may need to contact the user to receive feedback, inform them that they have left something behind, or to ask them to return an item they removed from the property.

The user may be asked to answer standard background questions, such as whether they have ever been convicted of a felony or filed for bankruptcy. In some examples, the user may be asked to provide credit information or authorize a credit check. In some examples, the user may be asked to provide a valid credit card number and to authorize a small charge to their card. This fee may act as a deterrent to users who are not serious about viewing properties for rental, or who may have malicious intentions (e.g., stealing from the property, damaging the property, etc.). The fee may be used as a deposit that is returned upon inspection of the property after the user leaves. In some examples, the fee is small and is kept as a showing charge.

The user may be asked to provide a current photo for verification purposes. For example, the owner or property management company may manually verify that the person is who they claim to be by checking the photo against public records, or by checking monitoring data, such as video or still images, from the property 101 upon the user's arrival. The user may be able to take a photo of themselves when they request to tour a property. For example, the user may be able to take a photo using their mobile device 140. The user may then transmit the photo to the server 130. The owner or property management company may then verify that the current photo matches public records or a photo sent to the server 130 from the monitor control unit 110. In some examples, the system 100 may automatically compare photos using facial recognition technology. Photo verification may be provided in various ways, such as over the network 105, through postal mail, etc. If the user does not match the photo they provided, they may be denied access to the property 101.

Once a user has been authenticated and successfully booked a showing time for the property, the server 130 may generate an access code or personal identification number (PIN) unique to the user. The access code is valid throughout the duration of the user's reservation, and is input to the electronic lock 128 to grant the user access to the property 101. In some examples, the access code is not valid for any other electronic locks or devices located on the property 101, or to any electronic locks or devices outside of the property 101. In other examples, the access code may be unique to the user, and may be used by the user to access multiple properties. For example, the user may schedule several showings for the same day. The server 130 may generate one access code for the user and communicate the code to each of the properties the user is scheduled to view. In some examples, the electronic locks at each property may maintain the times during which the codes are active. In other examples, the server 130 may manage the times during which the access codes are active for each property.

A user may then input their unique access code to the electronic lock 128 to gain access to the property 101. The electronic lock 128 may transmit data indicating that it has received an input. The server 130 may receive the access code data to record when a particular user has arrived at the property 101. In some examples, the server 130 may perform an action based on the access code data. For example, the server 130 may determine that a user, John, has entered his access code, and has entered the property 101. The server 130 may operate a speaker system located on the property 101 to greet John (e.g., saying "Welcome to your new home, John! Feel free to look around!"). In some examples, multiple prospective tenants may be inside the property 101, and the server 130 may provide a personalized greeting for each visitor. In some examples, the server 130 may notify the owner or property manager of the property 101 that a particular visitor has arrived. The owner or property manager may then greet the visitor personally (e.g., through a speaker system, through a phone call, through an interactive device within the property 101).

The server 130 may perform operations based on the access code data and/or the monitoring data. In some examples, the operations may include a personalized guided tour. For example, an interactive device such as a tablet or computer may be placed in the property 101. Upon detecting that a visitor has entered the property 101, the server 130 may initiate a greeting through the interactive device. In some examples, the server 130 may operate the interactive device to guide a visitor through key areas of the property 101. The interactive device may grant the visitor access to specific areas of the property 101. In some examples, the visitor may not access certain areas of the property 101 without the interactive device. For example, the visitor may be denied access to a second floor or a basement or a door leading to a different area of the property 101 unless they are holding the interactive device. The interactive device may communicate with doors and sensors through short-ranged wireless communication (RFID, NFC, etc.).

The server 130 may operate the interactive device to guide a user through a tour by providing voice-guidance, presenting augmented reality graphics, operating certain systems, etc. For example, the server 130 may operate the interactive device to turn on the lights of specific areas while they are described to the visitor by a voice-over. In some examples, the owner or property manager may be providing a live tour by controlling systems through the server 130 while talking to the visitor through the interactive device.

In some examples, the interactive device may collect and transmit data to the server 130. For example, the server 130 may be able to gather visitor interaction data or visitor location data based on the data received from the interactive device. The server 130 may use the visitor interaction data or visitor location data to determine how long a visitor has been at the property 101, predict the visitor's interest in the property 101, detect when a user is doing something unsavory (e.g., eating cookies from the cookie jar, stealing napkin holders, etc.).

The server 130 can collect user feedback through various interfaces, such as the interactive device or the prospective tenant's mobile device. For example, after a tour of the property 101, a prospective tenant, or user, can use the interactive device on-site to indicate that he is not interested in the property 101 because although it has the right number of bedrooms (e.g., four bedrooms), has a basement, and is in the correct neighborhood (e.g., Happyville), it doesn't have enough bathrooms (e.g., only two bathrooms).

The server 130 can solicit feedback from the user at any point during the tour, for example, by providing survey questions. The server 130 can present a questionnaire to the user with questions relevant to the current property 101 and to which the user's answers are stored and analyzed to determine whether a property that would be a better fit for the user can be found.

The server 130 can automatically determine when to solicit feedback form the user. For example, the server 130 can determine when a user is not interested in the property 101, or shows signs of interest in certain aspects of the property 101 and not others. For example, the server 130 can use data from cameras 126 to monitor whether the user is about to depart and present a survey to the user on his phone. In some examples, the server 130 can use data from the cameras to determine that the user lingered in the master bedroom and the backyard, and can tailor survey questions to detected interactions.

The server 130 can automatically detect interactions of the user with the property 101 through, for example, the use of machine learning models. The machine learning models may be models which accept sensor data collected by cameras and/or other sensors as inputs. The machine learning models may use any of a variety of models such as decision trees, linear regression models, logistic regression models, neural networks, classifiers, support vector machines, inductive logic programming, ensembles of models (e.g., using techniques such as bagging, boosting, random forests, etc.), genetic algorithms, Bayesian networks, etc., and can be trained using a variety of approaches, such as deep learning, perceptrons, association rules, inductive logic, clustering, maximum entropy classification, learning classification, etc. In some examples, the machine learning models may use supervised learning. In some examples, the machine learning models use unsupervised learning.

The server 130 can provide, for example, video footage from the cameras 126 and sensor data from various sensors 122 as input to the machine learning models to determine whether the user has interacted with the property 101 in a way that indicates that he is either interested or uninterested in a particular aspect of the property 101. These determinations can then be used by the server 130 to generate personalized questionnaires for the user to provide a better property-hunting experience.

For example, if a user walks past a room in the property 101 without stopping inside to look at the room, the server 130 can determine that the user does not like at least one aspect of the room, and can provide questions to the user about the room. If, however, the server 130 determines, from the user's answers to the questions, that the user likes the room, the server 130 can learn from the user's behaviors and adjust the machine learning models to better predict whether the particular user likes or dislikes a property. The server 130 can determine and store user preferences in a profile created for the user so that future listings can be identified as possibly being of interest to the user, and can alert the user that there is a property matching his criteria.

In some examples, the server 130 can store, in a database, an anonymized set of data based on prospective tenants' behavior regarding particular features of a property that indicate whether the prospective tenant likes or dislikes the particular feature. The server 130 can use this stored data to better predict, using the machine learning models, whether a future prospective tenant touring a particular property 101 likes or dislikes certain features of the property 101. The database allows the server 130 to select more relevant questions and provide better suggestions to prospective tenants, and reduces frustration of a prospective tenant that may occur if a realtor does not pick up on the prospective tenant's body language or if the prospective tenant has preferences for particular aspects of a property that he is unaware of.

The server 130 can provide a questionnaire focused on aspects of the property 101 that the user liked and aspects that the user would like to see changed in the next property the user is shown. If the user agrees to see a different property at the suggestion of the server 130, the server 130 can tailor subsequent questionnaires to determine whether the changed parameters of the different property meet the user's expectations. For example, the server 130 can ask the user, Tom, whether he would like to see a next property with a larger kitchen or with a lower monthly fee (e.g., rent, home owners association (HOA) fees, etc.), or what additional amenities the user would like to see.

In some examples, the server 130 can solicit or receive feedback telephonically, and the user can provide the feedback directly to a property manager of the property 101. For example, the property manager can be alerted that the user has finished his tour of the property 101, and that the user has indicated in his exit survey that he does not wish to rent the property 101. The property manager can then call the user to ask about whether the user would be interested in providing feedback that is used to find different properties for the user to tour. Feedback collected by the property manager can then be used as input to the server 130, and the server 130 can automatically determine whether there are other properties managed by the server 130 that satisfy parameters created based on the user's feedback.

The server 130 receives input of parameters associated with the current user and automatically performs a search for properties that match the input parameters. The server 130 can access, for example, a database of properties and input the parameters to find properties for the user. Continuing the example in which Tom is searching for a rental property, the server 130 can search for homes with four bedrooms, a basement, in Happyville, and with more than two bathrooms. Criteria specified by the user can be selected, for example, from a database of available criteria, or can be entered by the user. Criteria can include, for example, various characteristics of a property, including property square footage, building square footage, outdoor space (e.g., lawns, pools, gardens, backyards, garages, etc.), room square footage (e.g., bathrooms, kitchens, bedrooms, etc.), building characteristics (e.g., number of windows, size of doors, amount of storage space available, etc.) and other appropriate characteristics.

In examples where the server 130 manages properties for multiple property managers, owners, real-estate agents, etc., the server 130 can specifically perform searches based on the point-of-contact for the current property 101. For example, if the user is being helped by a particular real-estate agent, the server 130 can perform a search in the real-estate agent's inventory, instead of the entire inventory of the server 130, in order to preserve the existing tenant-agent relationship. By showing the prospective tenant properties managed by the same owner, real-estate agent, or property manager, the server 130 allows a relationship to develop, and improves the prospective tenant's experience by keeping him with a manager who knows what the prospective tenant is looking for. In other examples, the server 130 may allow the user to select whether he would like to only view properties managed by the same owner, property manager, real-estate agent, etc.

If there are homes that match the search criteria, the server 130 can offer the homes as suggestions for new properties to tour to the prospective tenant. A match does not have to be an exact match in which all search criteria are met. A match can include properties that meet a threshold number of criteria or are within a threshold of similarity to the criteria. For example, a house with four bedrooms, four bathrooms, and a basement, but is five miles outside of Happyville, can still be provided as a suggestion if a threshold distance is satisfied. In some examples, the prospective tenant can set some or all of the thresholds for the criteria. In other examples, the property manager can set the thresholds, or a default threshold can be used.

The server 130 can provide suggestions to the prospective tenant through various interfaces, including the interactive device or the prospective tenant's mobile device. For example, the server 130 can text the user a link to a website with selected new properties for the prospective tenant to tour. The server 130 can, in other examples, show property suggestions through the interactive device, send the prospective tenant an email with each listing, or provide the prospective tenant with a customizable list of data to a specified location, such as a different phone number that the prospective tenant uses.

By collecting feedback from the prospective tenant while he is still on the property 101, the server 130 provides real-time service to the tenant and improves property management technology by automating the experience of helping a prospective tenant find a property he is interested in renting.

If a prospective tenant decides he wants to see one of the suggested properties, the server 130 further automates the process by allowing the prospective tenant to schedule a viewing at that time. For example, if a prospective tenant selects one or more of the suggested properties managed by the server 130, the prospective tenant can request to schedule a viewing, and the server 130 can automatically vet the prospective tenant using his previously provided information and generate an access code specifically for the prospective tenant. The server 130 can schedule a viewing appointment and generate an access code for each property the prospective tenant is interested in seeing.

By automatically scheduling and generating access codes for a prospective tenant who is still searching, the server 130 improves the searching experience for a user by reducing delays associated with, for example, working schedules of property managers. A tenant can schedule a viewing at the time he has indicated he is interested in seeing the property, and an access code can be generated at the same time, such that he does not have to experience any delays between when he has decided to view another property and when he can view it. The server 130 provides an improved experience by reducing, or even eliminating, delays in a prospective tenant's property search, and thus the tenant is more likely to continue seeing properties for which he is scheduled.

The server 130 may initiate operations based on the access code data and/or monitoring data such as restricting access to certain areas of the property 101, arming alarm systems, etc. For example, electronic locks may be installed on doors such as a master bedroom closet. The electronic locks may be enabled when an access code is detected and a visitor enters the property 101 to prevent the visitor from opening the closet and rifling through the owner or current tenant's personal items.

When a current tenant is still occupying the property 101, certain operations of the system 100 may be altered. A tenant could request to change available showing hours to coincide with when they are home, or when they are away. For example, a tenant could request that visitors only be let in between 8 a.m. and 6 p.m. on weekdays, when they are not home. In some examples, a tenant could alter settings and operations of the monitor control unit 110. For example, if the tenant has opted to receive a photo from a camera each time someone arrives at the front door because he wants to make sure his daughter has come home from school, the tenant may disable the notifications during showing times. In some examples, the server 130 may determine whether the access code received is for a prospective tenant and refrain from sending a photo to the tenant, while sending other photos taken from people using a physical key.

In some examples, if the current tenant has requested certain videos to be saved, or certain actions to trigger notifications or alarms, the settings may be overridden or altered when prospective tenants are detected to have entered the property 101. For example, if the current tenant only uses the back door of the property 101 and has requested a notification every time the front door is used, the notification settings may be automatically adjusted. In some examples, the settings are adjusted by the owner or property manager of the property 101. For example, the owner or property manager might enforce more or less restrictions on where a visitor can go or what a visitor can do. The property manager might enforce that personal closet doors are locked to deter theft, even if the current tenant has not specified this setting.

In some examples, sensors or other monitoring devices may be installed throughout the property 101. The sensors may include pressure sensors, motion sensors, light sensors, etc., and may transmit data to the monitor control unit 110 or store collected data locally. The sensor data may be used to monitor the activity of visitors to the property 101. For example, the server 130 may determine, from data collected by a sensor on the refrigerator door, that the refrigerator door was opened but never closed. The server 130 may determine which users are inside the property 101 from the access code data and send a notification to the users to remember to close the refrigerator door.

In some examples, the server 130 may use a combination of the sensor data and the access code data to determine which particular users are in an area of property 101. For example, there may be five prospective tenants simultaneously touring the property 101. The server 130 may determine from the sensor data (e.g., video, still images, etc.) that a person is in the master bedroom of the property 101, where they have been asked not to go. For example, video data from the cameras 126 may be used with facial recognition to determine the identity of a visitor or prospective tenant. In some examples motion sensor data from the sensors 122 may be used to track visitors' and/or prospective tenants' movements in or around the property 101. The server 130 may compare the sensor data with the access code data and the user data associated with the access code to determine that the user is Ronald. The server 130 may send Ronald a notification informing him that the owner or property manager has been notified, and that he should exit the master bedroom. The notification may be delivered through various media, such as text message, email, phone call, application notification, etc. In some examples, the server 130 may simply send Ronald a notification asking him to leave. The server 130 may set off an alarm immediately upon detection of entry to a forbidden area. In some examples, the server 130 may use systems such as an alarm system or a speaker system to interact with visitors. In some examples, the server 130 may connect a visitor with the owner or property manager of property 101 upon detecting a condition for which the owner or property manager should be notified. For example, the server 130 may call the visitor and the owner or property manager and connect the calls.

When one or more current tenants are still occupying the property 101, the server 130 may determine whether a person performing an action or accessing an area is a current tenant or a prospective visitor. For example, a current tenant may be permitted to access all areas of the property 101 and interact with all devices and systems of the property 101, while a visitor who performs the same actions or tries to access the same areas may set off an alarm or receive a notification requesting that they cease.

The server 130 may determine, using the monitoring data and the access code data, how long a user has been in the property 101. The server 130 may analyze such data to predict a user's interest in the property, determine whether a user has been at the property for too long, etc. The server 130 may send the visitor a notification informing them that their reservation period is over. In some examples, the server 130 may turn off the lights, or initiate the unoccupied profile for the devices and systems on the property 101 once the last visitor's reservation period is over. For example, the server 130 may begin to dim the lights on the property 101 five minutes after warning a visitor that they are the last visitor of the day and that their reservation period is over.

In some examples, the server 130 may notify the owner or property manager if a visitor is detected within the property 101 after being warned that their time is up. In some examples, the server 130 may present the owner or the property manager with options for actions to take. For example, the server 130 may ask the owner or property manager if authorities need to be contacted. In some examples, the server 130 may detect predefined conditions and automatically notify the authorities. For example, if a visitor is setting fire to the house, the server 130 may automatically alert the police and fire department.

In some examples, a prospective tenant may enter a departure code that indicates a prospective tenant's interest in the property 101. For example, a prospective tenant may input a code of "123" to express that they wish to put down a deposit and rent the property 101 immediately. The prospective tenant may input a code to indicate that they are still looking, and does not wish to make a commitment at the time. In some examples, the prospective tenant may input a departure code to indicate that they are not interested in renting the property 101 at all. The departure codes may be provided to the prospective tenant as options read from a list (e.g., "Press 1 to indicate you wish to rent this property. Press 2 to indicate . . . "). In some examples, the departure codes may be specific combinations entered into a user interface element of the electronic lock, such as a keypad. The departure codes may be entered by the user through a web interface, a mobile application, etc.

In some examples, if a visitor has indicated immediate interest in renting the property 101 and a current tenant is still occupying the property 101, the server 130 may prompt the owner or property manager to contact the current tenant to ask the current tenant whether they would like to end their lease early and be credited an amount for the remainder of their lease. For example, if a current tenant only has two weeks left of their three year lease and already has a lease signed elsewhere, the server 130 may transmit a communication to the current tenant asking if they would like to terminate their lease early and be credited for the remainder of their lease. The flexibility granted by the system 100 may reduce vacancy times of properties and improve the rental experience for both the current tenant and the prospective tenant.

In some examples, a tenant may move out of the property 101 before the end of their lease, but they may not inform the owner or property manager. For example, a tenant may forget to inform the owner or property manager that their new job in a different state begins three weeks before the end of their lease. The current tenant may move out days, weeks, etc. before the end of their lease, making the property available for re-rental. The server 130 may use the monitoring data and/or access data to determine that the current tenant has moved out, and has not returned for a predetermined amount of time. The server 130 may then contact the owner or property manager to inform them that the property is vacant. In some examples, the server 130 may automatically flag the property as vacant.

In some examples, the server 130 may access, with permission, the current tenant's schedule data to determine when the current tenant will be moving out. In some examples, the current tenant may take a vacation before moving out. The server 130 may use the schedule data to determine that, while there has been no activity within the property 101 for two weeks, the current tenant is returning a week before the end of their lease to move out. The server 130 would then delay flagging the property 101 as vacant.

The system 100 also includes one or more sensors or detectors. For example, the monitoring system may include multiple sensors 122. The sensors 122 may include a contact sensor, a motion sensor, a glass break sensor, or any other type of sensor included in an alarm system or security system. The sensors 122 also may include an environmental sensor, such as a temperature sensor, a water sensor, a rain sensor, a wind sensor, a light sensor, a smoke detector, a carbon monoxide detector, an air quality sensor, etc. The sensors 122 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 122 may include a radio-frequency identification (RFID) sensor that identifies a particular article that includes a pre-assigned RFID tag.

The appliances 124 may be home automation devices connected to the network 105 that are configured to exchange electronic communications with other devices of the system 100. The appliances 124 may include, for example, connected kitchen appliances, controllable light sources, safety and security devices, energy management devices, and/or other types of electronic devices capable of exchanging electronic communications over the network 105. In some instances, the appliances 124 may periodically transmit information and/or generated data to the monitor control unit 110 such that the monitor control unit 110 can automatically control the operation of the appliances 124 based on the exchanged communications. For example, the monitor control unit 110 may operate one or more of the appliances 124 based on a fixed schedule specified by the user. In another example, the monitor control unit 110 may enable or disable one or more of the appliances 124 based on received sensor data from the sensors 122.

The cameras 126 may be video/photographic cameras or other type of optical sensing devices configured to capture images. For instance, the cameras 126 may be configured to capture images of an area within a building monitored by the monitor control unit 110. The cameras 126 may be configured to capture single, static images of the area and also video images of the area in which multiple images of the area are captured at a relatively high frequency (e.g., thirty images per second). The cameras 126 may be controlled based on commands received from the monitor control unit 110.

The cameras 126 may be triggered by several different types of techniques. For instance, a Passive Infra Red (PIR) motion sensor may be built into the cameras 126 and used to trigger the cameras 126 to capture one or more images when motion is detected. The cameras 126 also may include a microwave motion sensor built into the camera and used to trigger the cameras 126 to capture one or more images when motion is detected. The cameras 126 may have a "normally open" or "normally closed" digital input that can trigger capture of one or more images when external sensors (e.g., the sensors 122, PIR, door/window, etc.) detect motion or other events. In some implementations, the cameras 126 receives a command to capture an image when external devices detect motion or another potential alarm event. The cameras 126 may receive the command from the controller or directly from one of the sensors 122.

In some examples, the cameras 126 trigger integrated or external illuminators (e.g., Infra Red, Z-wave controlled "white" lights, etc.) to improve image quality when the scene is dark. An integrated or separate light sensor may be used to determine if illumination is desired and may result in increased image quality.

The cameras 126 may be programmed with any combination of time/day schedules, system "arming state", or other variables to determine whether images should be captured or not when triggers occur. The cameras 126 may enter a low-power mode when not capturing images. In this case, the cameras 126 may wake periodically to check for inbound messages from the controller. The cameras 126 may be powered by internal, replaceable batteries if located remotely from the monitor control unit 110. The cameras 126 may employ a small solar cell to recharge the battery when light is available. Alternatively, the cameras 126 may be powered by the controller's 112 power supply if the cameras 126 is co-located with the controller.

In some implementations, the cameras 126 communicates directly with the rental property management server 130 over the Internet. In these implementations, image data captured by the cameras 126 does not pass through the monitor control unit 110 and the cameras 126 receives commands related to operation from the rental property management server 130.

The electronic lock 128 may be an electronic computing device that is placed on the exterior of the property 101 and configured to capture video and image footage of the detectable region 128a of the property 101. In some implementations, the electronic lock 128 can be a connected device placed on the front door of the property 101 that is capable of receiving a button press from an individual near the front door (e.g., the individual 102). In such implementations, the electronic lock 128 may be configured to exchange communications with a separate security camera that captures footage of the front exterior of the property 101. Alternatively, in other implementations, the electronic lock 128 may include one or more integrated camera devices that are capable of capable of collecting footage of the detectable region 128a. The integrated cameras may also be capable of detecting motion within the detectable region 128a such that, after initially detecting an action such as an input to the electronic lock 128, the electronic lock 128 can correlate a detection event and subsequent motion detected within the detectable region 128a in order to identify possible security risks to the property 101.

In some implementations, the electronic lock 128 may be capable of performing one or more response actions to a detected input of an incorrect access code to deter possible intruders. For instance, in some examples, the electronic lock 128 can include a speaker that plays a pre-recorded message to indicate that someone is presently within the property 101 even when the property 101 is unoccupied. In other examples, the electronic lock 128 may be capable of transmitting signals to devices within the property 101 (e.g., the sensors 122, the appliances 124, the cameras, 126) in response to detecting an action to simulate occupancy within the property 101. In other examples, the electronic lock 128 may also communicate directly with the monitor control unit 110, which can then relay the communication with the electronic lock 128 to devices within the property over another signal path using a different communication protocol (e.g., Bluetooth, Bluetooth LE, ZWave, ZigBee, etc.).

The rental property management server 130 is an electronic device configured to provide monitoring services by exchanging electronic communications with the monitor control unit 110 and the user device 140 over a network. For example, the rental property management server 130 may be configured to monitor events (e.g., alarm events) generated by the monitor control unit 110. In this example, the rental property management server 130 may exchange electronic communications with the network module included in the monitor control unit 110 to receive information regarding events (e.g., alarm events) detected by the monitor control unit 110. The rental property management server 130 also may receive authorization information (e.g., keypad codes, electronic lock codes, etc.) from the user device 140.

The user device 140 may be an electronic device associated a user interested in the property 101 that exchanges communications over a network, such as the Internet or the network 105. For example, the user device 140 may be a smartphone, tablet, or other types of network devices. The user device 140 may access a service made available by the rental property management server 130 on the network 105, such as a mobile application. The data generated by the user device 140 may be transmitted over the network 105, and may be monitored by the monitor control unit 110.

In some implementations, the rental property management server 130 may route alarm data received from the network module or the user device 140 to a central alarm station server that is maintained by a third-party security provider. The alarm data can include captured video footage of the detected individual within the detectable region 128a, which is processed by the third-party security provider to request emergency assistance to the property 101. For example, the alarm data can be transmitted to law enforcement so indicate a potential security breach within the property 101. In some instances, the alarm data can also include metadata identified by the electronic lock 128 within the captured video footage (e.g., gender of the individual, suspected identity of the individual, key physical attributes, etc.). In these examples, the alarm data can either be transmitted to law enforcement after requesting confirmation from the user, or automatically transmitted without intervention from the user.

The rental property management server 130 may store sensor and image data received from the monitoring system and perform analysis of sensor and image data received from the monitoring system. Based on the analysis, the rental property management server 130 may communicate with and control aspects of the monitor control unit 110 or an interactive device within the property 101.

The interactive device may be an electronic device associated with a property owner or an occupant that exchange network communications over a network, such as the Internet or the network 105. For example, the interactive device may be a smartphone, tablet, personal computer (PC), network-enabled media player, home entertainment system, cloud storage device, and other types of network devices. The interactive device may access a service made available by the rental property management server 130 on the network 105, such as a mobile application. The data generated by the interactive device may be transmitted over the network 105, and may be monitored by the monitor control unit 110.

The interactive device can include a native surveillance application. The native surveillance application refers to a software/firmware program running on the corresponding mobile device that enables the user interface and features described throughout. The interactive device may load or install the native surveillance application based on data received over a network (e.g., the network 105) or data received from local media. The native surveillance application runs on mobile devices platforms. The native surveillance application also enables the interactive device to receive and process image and sensor data from the monitoring system.

In some implementations, the interactive device communicate with and receive monitoring system data from the monitor control unit 110 using a communication link. For instance, the interactive device may communicate with the monitor control unit 110 using various local wireless protocols such as Wi-Fi, Bluetooth, Zwave, Zigbee, HomePlug (Ethernet over powerline), or wired protocols such as Ethernet and USB, to connect the interactive device to local security and automation equipment. The interactive device may connect locally to the monitoring system and sensors 122 and other devices. The local connection may improve the speed of status and control communications because communicating through a network, such as the Internet or the network 105 with a remote server (e.g., the rental property management server 130) may be significantly slower.

Although the interactive device are shown as communicating with the rental property management server 130, the interactive device may also communicate directly with the sensors 122 and other devices controlled by the monitor control unit 110 when the interactive device is near the property 101. For example, the interactive device may exchange communications with the devices of the system 100 over the network 105.

In some implementations, the interactive device receives monitoring system data captured by the monitor control unit 110 through the network 105. The interactive device may receive the data from the monitor control unit 110 through the network 105 or the rental property management server 130 may relay data received from the monitor control unit 110 to the interactive device through the network 105. In this regard, the rental property management server 130 may facilitate communication between the interactive device and the monitoring system.

In some implementations, the system 100 intelligently leverages the monitor control unit 110 to aid in security monitoring, property automation, and property management. For example, the monitor control unit 110 may aid in investigating alarm events detected at the property 101 by the monitor control unit 110. In this example, the monitor control unit 110 may detect an alarm event (e.g., a fire alarm, an entry into the property 101 when the system is armed "Stay," etc.) and, based on the detected alarm event, control the monitor control unit 110 to attempt to identify persons in the property 101 at the time of the alarm event. Specifically, the monitor control unit 110 may send a control command that causes the sensors 122 and the cameras 126 to perform a coordinated and automated search for persons in the property 101. Based on the control command received, each of the cameras 126 captures images of the property 101.

In some examples, the monitor control unit 110 may be assigned to different areas of the property 101 where the monitor control unit 110 can move in an unobstructed manner. In these examples, the monitor control unit 110 may be assigned to different levels in a property (e.g., an upstairs robotic device and a downstairs robotic device) and even different rooms or sections that are potentially blocked by doors. The monitor control unit 110 coordinate tracking movement based on the assigned areas. For instance, the monitor control unit 110 determines areas in a property where an event has been detected (e.g., where motion is sensed, where a door or window is opened, etc.) and only controls the robotic devices assigned to the determined areas to operate. In this regard, the monitor control unit 110 may use location of users determined using the sensors 122 to control operation of the monitor control unit 110.

In addition, the server 130 may perform energy management for the rental property by controlling the pool heater at the rental property using techniques similar to those used by the server 130 in performing energy management using the thermostat (e.g., setting a target temperature for the pool heater and/or turning on and off the pool heater). For instance, the server 130 may use prospective tenant reservation information (e.g., arrival date-time/departure date-time) and/or electronic lock event data to turn on the heater a particular number of hours in advance of a prospective tenant's arrival and to turn off the heater upon prospective tenant departure. The server 130 may maintain a "visitor" or "occupied" operational profile until the last scheduled visitor is expected to depart. In some examples, the server 130 only initiates an unoccupied operational profile when all visitors are determined to be off of the property 101. The particular number of hours and/or the heater temperature setting may be set by the owner, the rental management company, and/or the prospective tenant using techniques similar to those described above for establishing energy management settings for the thermostat.

By controlling energy usage of the pool heater remotely, the server 130 may reduce the need to send employees to remote rental properties to turn off/on pool heaters, which may reduce labor costs, travel expenses, and unnecessary energy expenses that result from human error in failing to turn pool heaters on/off during periods of the property being unoccupied.

Examples of implementations of the system 100 can use various types of data captured devices within the property 101 (e.g., the sensors 122, the appliances 124, the cameras 126, and the electronic lock 128) to perform differential actions based on the present conditions of the property 101. In some instances, the rental property management server 130 transmits different notifications of a detected input to the electronic lock 128 based on detecting the identity of the individual 102 that presses the electronic lock 128. For example, the rental property management server 130 may transmit a low priority notification to the interactive device if the individual 102 is determined to be a known individual (e.g., family member, neighbor, or commonly detected individual etc.) whereas the rental property management server 130 may transmit a high priority notification if the individual 102 is determined to be an unknown individual. In some instances, the priority of the notification can also be based on a classification associated with the detected individual 102 (e.g., service personnel, mail carriers, etc.).

In some instances, the notifications transmitted by the rental property management server 130 may be based on a security status of the property 101 assigned a security system of the property 101. In such instances, the lock action repository 132 can specify a subset of users to transmit notifications based on the security status of the property 101. For example, the rental property management server 130 may transmit a notification to all identified users associated with the property 101 in response to the security status indicating a fire, whereas the rental property management server 130 may transmit a notification only to administrator users in response to the security status indicating a breach within the property 101. In other examples, the rental property management server 130 may transmit motion-based alerts if the security status of the property 101 is set to an "alarmed" mode.

In some implementations, the rental property management server 130 can transmit instructions to the monitor control unit 110 to adjust one or more settings associated with the devices within the property 101. For instance, in response to detecting input to the electronic lock 128, the monitor control unit 110 may receive instructions to change the indoor temperature, or operate the appliances 124 on or off. In such instances, the particular instructions received by the monitor control unit 110 can be varied based on the identity of the detected individual 102. In other instances, the particular instructions can also be based on other types of information associated with the detected individual 102 (e.g., motion detected within the detectable region 128a, time difference between a detected input to the electronic lock 128 and opening the front door of the property 101, etc.).

In some implementations, where the rental property management server 130 transmits notifications to the interactive device, the particular notification transmitted can be based on the location of the interactive device. For example, a notification can be prevented from being transmitted if the interactive device is near or with the property 101. In other examples, the rental property management server 130 can transmit notifications to another remote user if the interactive device is located within the property 101.

In some implementations, the rental property management server 130 determines the particular action to be performed in response to a detected input to the electronic lock 128 based on monitoring one or more parameters indicated by the data transmitted from the monitor control unit 110. For instance, as described more particularly with respect to FIG. 2, the lock action repository 132 can specify different actions to be performed based on occupancy information gathered by the devices within the property 101, information gathered by the electronic lock 128, and/or the security status indicated by a security system of the property 101.

Figure 2:
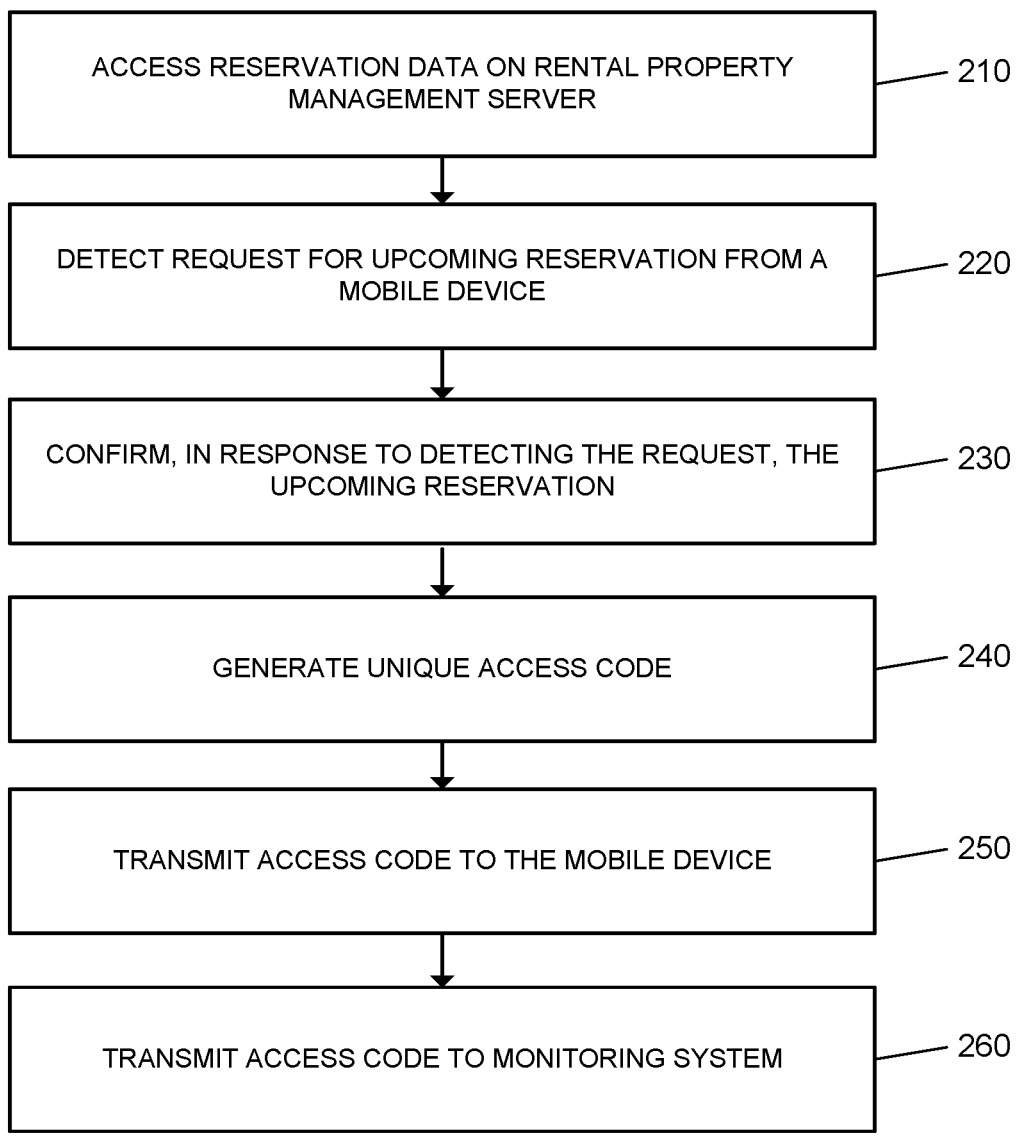
FIGS. 2-3 are flow charts of example processes that enable unattended property showing.

FIG. 2 illustrates an example of a process 200 for enabling unattended property showing. Briefly, the process 200 may include accessing reservation data on a rental property management server (210), detecting a request for an upcoming reservation from a mobile device (220), confirming, in response to detecting the request, the upcoming reservation (230), generating a unique access code (240), transmitting the access code to the mobile device (250), and transmitting the access code to a monitoring system of a property (260).

In more detail, the process 200 may include accessing reservation data on a rental property management server (210). For example, the system 100 may access data from the rental property management server 130 indicating reservations made by users. In some examples, the data may include the date and time of the reservation. The data may include the name of the user, the user's contact information, etc. For example, if a prospective tenant, John, has made a reservation and his reservation data has been stored in the rental property management server 130, the data may include John's phone number, the time and date he wishes to view a rental property, and which rental property he is interested in. Then, once the system 100 receives a request for an upcoming reservation, the available times can be compared to a time slot indicated in the request and the system 100 can determine whether to confirm or deny the request for the upcoming reservation.

In some examples, the system 100 may access reservation data that indicates reservations made by users, and can generate a user interface for a client device that showing available times based on the reservation data. As user of the client device can then select an available time to tour the property.

The process 200 may include detecting a request for an upcoming reservation from a mobile device (220). For example, the mobile device 140 of a user 104 may transmit a request for a reservation to the rental property management server 130. The request for a reservation may be made for a viewing of a property in the future. In some examples, the request for a reservation may include information about the user making the request. For example, if Amy wants to see 111 Dryden Road on Saturday, May 14, between 3:30 p.m. and 4:30 p.m., she may be directed to a web application or website to enter information. Amy may be prompted to enter reservation details, such as the date, time, and property. In some examples, Amy may be asked to enter personal details relevant to her search, such as her photo, credit information, a background check, etc. Amy's information may be used to verify her identity or screen her eligibility as a prospective tenant. In some implementations, the server 130 may generate an interface for the user 104 to request a reservation where the available time slots for the user 104 to make a reservation are based on the accessed reservation indicating that those time slots are available for the user 104 to view the property.

The process 200 includes confirming, in response to detecting the request, the upcoming reservation (230). For instance, once the rental property management server 130 detects the request, the rental property management server 130 can confirm the request, generating reservation data associating the mobile device with the property and time slot indicated in the request. Confirming the reservation can include verifying the user's information and updating reservation data in the rental property management server 130 for the property. If, for example, the owner, property manager, or real-estate agent for the property has a policy limiting the number of prospective tenants who can view the property, the rental property management server 130 can track the number of users with confirmed reservations for the time slot and reject confirmations based on whether the policy limit has been reached.

The process 200 may include generating a unique access code (240). For instance, rental property management server 130 may generate a unique access code that grants access to a rental property. The unique access code may be in any form, such as an alphanumeric code, an encrypted code, a gesture, a motion, a sound, etc. In some examples, the unique access code is unique to each unique request to view a property. For example, each time a request is received to view a property, regardless of the user making the request, a unique access code is generated. In some examples, the unique access code is unique to the user requesting the reservation. For example, Tom may request multiple reservations for different properties and one unique access code is generated that is shared for each request made by Tom. In some examples, the unique access code is unique to the property the reservation is made for. The unique access code can be input to a monitoring system of the property in a variety of ways, including over wireless communications, manually entered by a user at an electronic lock or keypad, played by the mobile device, etc.

The process 200 may include transmitting the unique access code to the mobile device (250). For example, the rental property management server 130 may transmit the unique access code through a wireless communication, a physical communications link, etc. to the mobile device 140. The unique access code may be transmitted to the mobile device 140 through various methods, such as text message, email, voicemail, phone call, etc. In some examples, the user 104 may download the unique access code to the mobile device 140 as a data file through the network 105, which may be the Internet. In some examples, the unique access code may be transferred to the mobile device 140 through a physical communications link, such as through a docking port, a data transfer cable, etc. In some examples, the unique access code may be transferred to the mobile device 140 wirelessly, using various communications protocols and technologies such as NFC, WiFi, Bluetooth, Z-Wave, Zigbee, etc.

The process 200 may include transmitting the access code to a monitoring system of a property (260). For example, the rental property management server 130 may transmit the unique access code to the monitor control unit 110 on the property 101. The unique access code may be transmitted to the monitor control unit 110 through wireless communication, a physical communications link, etc. For instance, the rental property management server 130 may communicate directly with the monitor control unit 110. In some examples, the server 130 may communicate with the monitor control unit 110 through various methods, such as text message, email, voicemail, phone call, etc. In some examples, the user 104 may download the unique access code to the monitor control unit 110 as a data file through the network 105, which may be the Internet. In some examples, the unique access code may be transferred to the mobile device 140 through a physical communications link, such as through a docking port, a data transfer cable, etc. In some examples, the unique access code may be transferred to the mobile device 140 wirelessly, using various communications protocols and technologies such as NFC, WiFi, Bluetooth, Z-Wave, Zigbee, etc.

Figure 3:
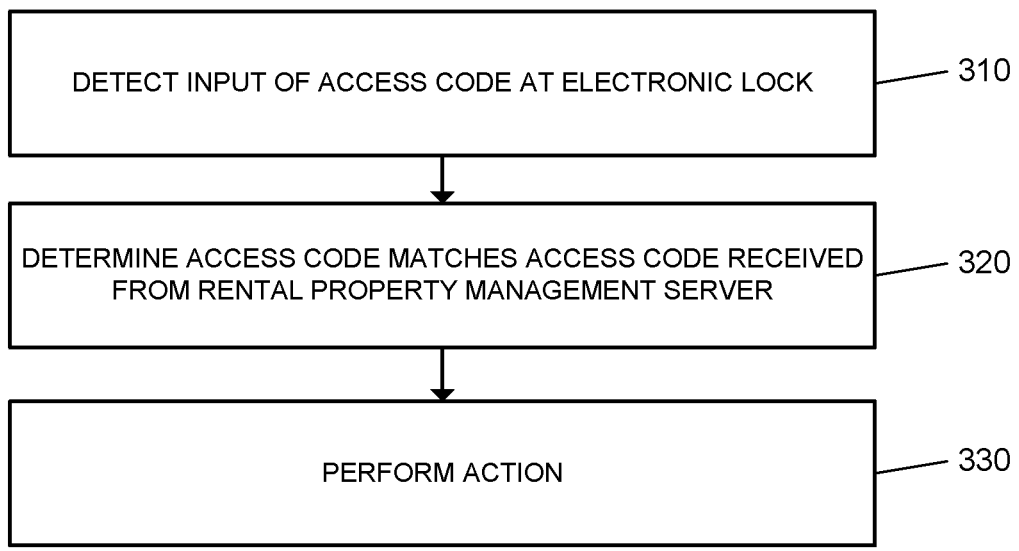

FIG. 3 illustrates an example of a process 300 for enabling unattended property showing. Briefly, the process 300 may include detecting an input of an access code at an electronic lock (310), determining that the input access code matches the access code received from the rental property management server (320), and performing an action (330).

The process 300 may include detecting input of an access code at an electronic lock (310). For example, the monitor control unit 110 may detect an input of an access code at the electronic lock 128. In some examples, the monitor control unit 110 may receive data associated with the input of the access code, such as data from various sensors 122 or cameras 126. For example, if an individual near the front door 102 is inputting an access code to the electronic lock 128, the monitor control unit 110 may receive data including sensor data and camera data that provides information about the individual 102, such as a recording of their voice, a photo of them, etc.

The process 300 may include determining that the access code received through input to the electronic lock matches the unique access code received from the rental property management server (320). For instance, the monitor control unit 110 may determine that the access code received through input to the electronic lock 128 matches the unique access code received from the rental property management server 130. In some examples, the monitor control unit 110 may compare the access codes to determine whether they match; the access codes could be determined to be matching in various ways. There may be a threshold for a match between the codes. In some examples, the codes must be identical to be considered a match. In some examples, the access codes may be related such that one code may be obtained by performing an operation to the other code. The access codes may be considered matching if the one code is a counterpart to the other code. For example, if a code or unique PIN of '3481' is transmitted to a user, the electronic lock 128 could pose a question such as "What is the square root of the unique PIN you received?" The question posed by the electronic lock 128 could be answered by the other code, '59', and used as input to the electronic lock 128.

In some examples, the monitor control unit 110 transmits the access codes to be analyzed. For example, the monitor control unit 110 may transmit the access codes to the server 130. The server 130 may determine whether the access codes match. In some examples, the server 130 may transmit the access codes to be analyzed. In some examples, the monitor control unit 110 may transmit the access codes to the rental property management server 130 to be analyzed. In some examples, the rental property management server 130 may automatically analyze and compare the access codes to determine whether they match.

The process 300 may include performing an action in response to determining whether the access code received as input to the electronic lock matches the unique access code received from the rental property management server (330). For instance, the monitor control unit 110 may perform an action in response to determining that the access codes match and perform a different action in response to determining that the access codes do not match. In some examples, the monitor control unit 110 may perform a different actions in response to determining that the access codes match to a certain degree, up to a certain threshold, or in a certain way.

In some examples, the monitor control unit 110 may perform various actions, such as activating a security system, deactivating a security system, granting a visitor access to the property 101, collecting data from cameras 126, collecting data from sensors 122, etc. For example, if it has been determined that the access codes match, the monitor control unit 110 may grant an authorized user 104 access to the property 101. In some examples, if it has been determined that the access codes do not match, the monitor control unit 110 may activate a security system and collect camera data from cameras 126 of the individual near the front door 102 that input the access code that does not match.

Figure 4:
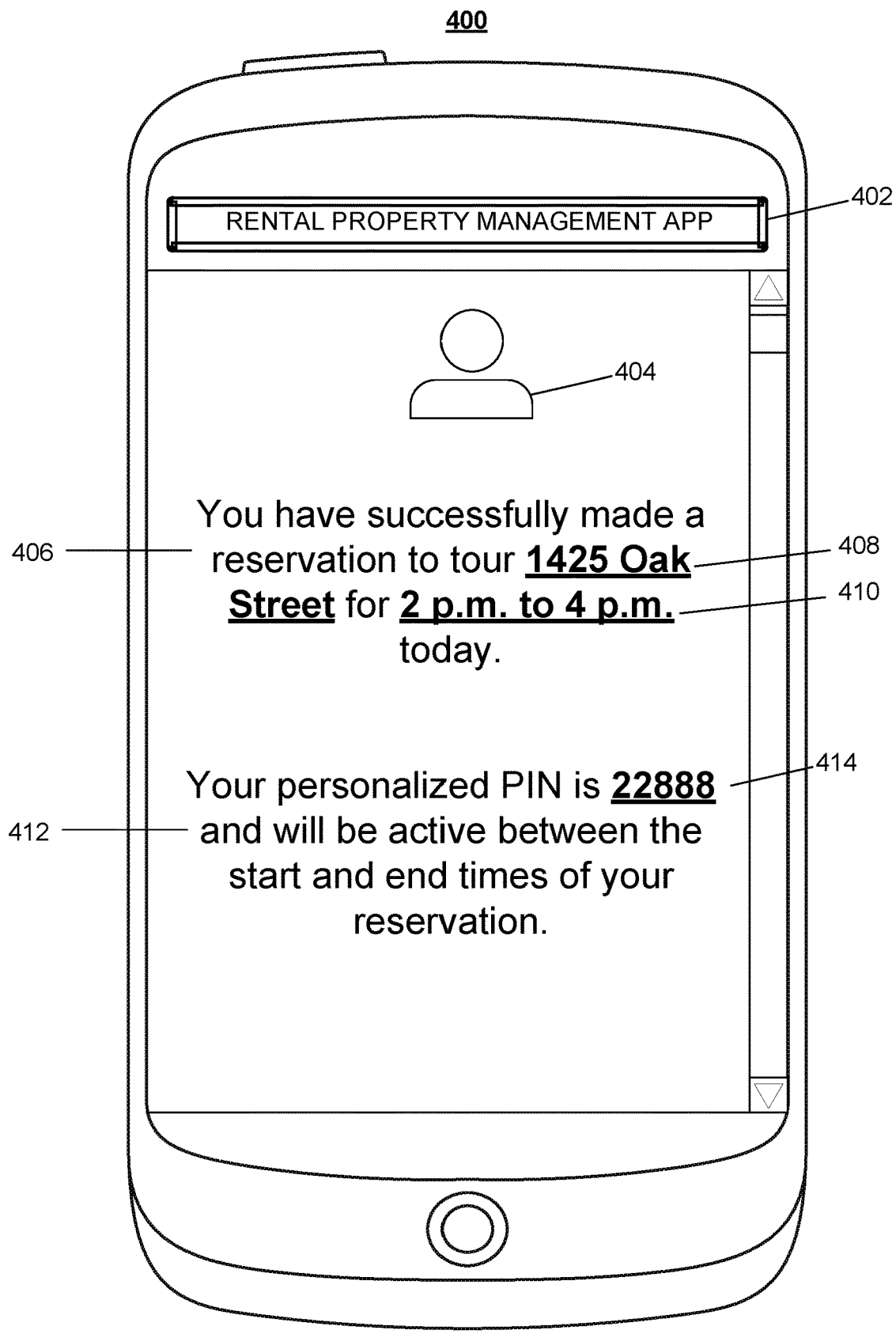
FIGS. 4-5 illustrate example interfaces for unattended property showing.

FIG. 4 illustrates a diagram of an example interface 400 for unattended property showing. The interface 400 includes a title 402, photo 404, reservation information 406, property address 408, reservation time 410, access code information 412, and access code 414. In some examples, the interface 400 is used by a prospective tenant for making a reservation to view a property. In some examples, the interface 400 is used by the owner or property manager of the property for which the reservation is made. The title 402 provides information about the interface 400 and lets a user know what app they are using. For example, a user may be redirected from a website to the interface 400. The interface 400 may be various kinds of interfaces. In some examples, the interface 400 may be an application. In some examples, the interface 400 may be a website or a web application.

The photo 404 provides visual information about the user making the reservation. In some examples, the photo 404 may be uploaded by the user while using the interface 400. For example a user may be asked by the interface 400 to provide visual identification. In some examples, the user may be able to upload a photo through an application on the mobile device 140. The user may be able to upload the photo 404 through various methods, such as through a personal computer, through a link to a photo hosted on the Internet, etc. In some examples, the user may be able to edit or delete the photo 404 by selecting the photo 404. For example, the photo 404 may be a hyperlink to the hosted photo, may redirect the user to a photo editing interface, etc.

The reservation information 406 provides the user with information about their reservation. In some examples, data such as the property address 408 and the reservation time 410 are shown. The reservation information 406 may include more information, such as which entrance to use, which areas are available for viewing, etc. The reservation information 406 may include less information, such as only providing the property address 408. For example, a user may be able to make a reservation for the entire day if they are unsure of their schedule; the reservation information 406 would then only show the address, or may show the reservation time as a date.

In some examples, the property address 408 and the reservation time 410 are displayed in a visually different way from the rest of the reservation information 406. For example, the property address 408 and the reservation time 410 may be displayed in a different font, bolded, italicized, different font size, different color, etc. In some examples the user is able to select the visually different elements of the reservation information 406. Selecting elements of the reservation information 406 may perform an action dependent on the selection. For example, a user may be able to select the property address 408 to make a change to the reservation or select the reservation time 410 to be redirected to an interface to make a change to the time of the reservation. All, some, or no elements of the reservation information 406 may be selectable or changeable.

The access code information 412 provides the user with information about the unique access code 414. For instance, the access code information 412 may provide the user with information about the access code 414 and how to use it. In some examples, the access code information 412 may include only the access code 414. In some examples, the access code information 412 may include more information than the access code 414. The access code 414 may be various kinds of codes, such as a PIN, an alphanumeric code, an audio file, a video file, a gesture, a photo, etc.

In some examples, the access code 414 is displayed in a visually different way from the rest of the access code information 414. For example, the access code 414 may be displayed in a different font, bolded, italicized, different font size, different color, etc. In some examples the user is able to select the access code 414. Selecting elements of the reservation information 406 may perform an action dependent on the selection. A user may be able to select the access code 414 to have the mobile device 140 use the access code to grant the user access to the property. For example, Ryan may select the access code 414 to have the mobile device 140 transmit the access code to the electronic lock 128. In some examples, the user may enter the access code 414 as shown into the electronic lock 128.

Figure 5:
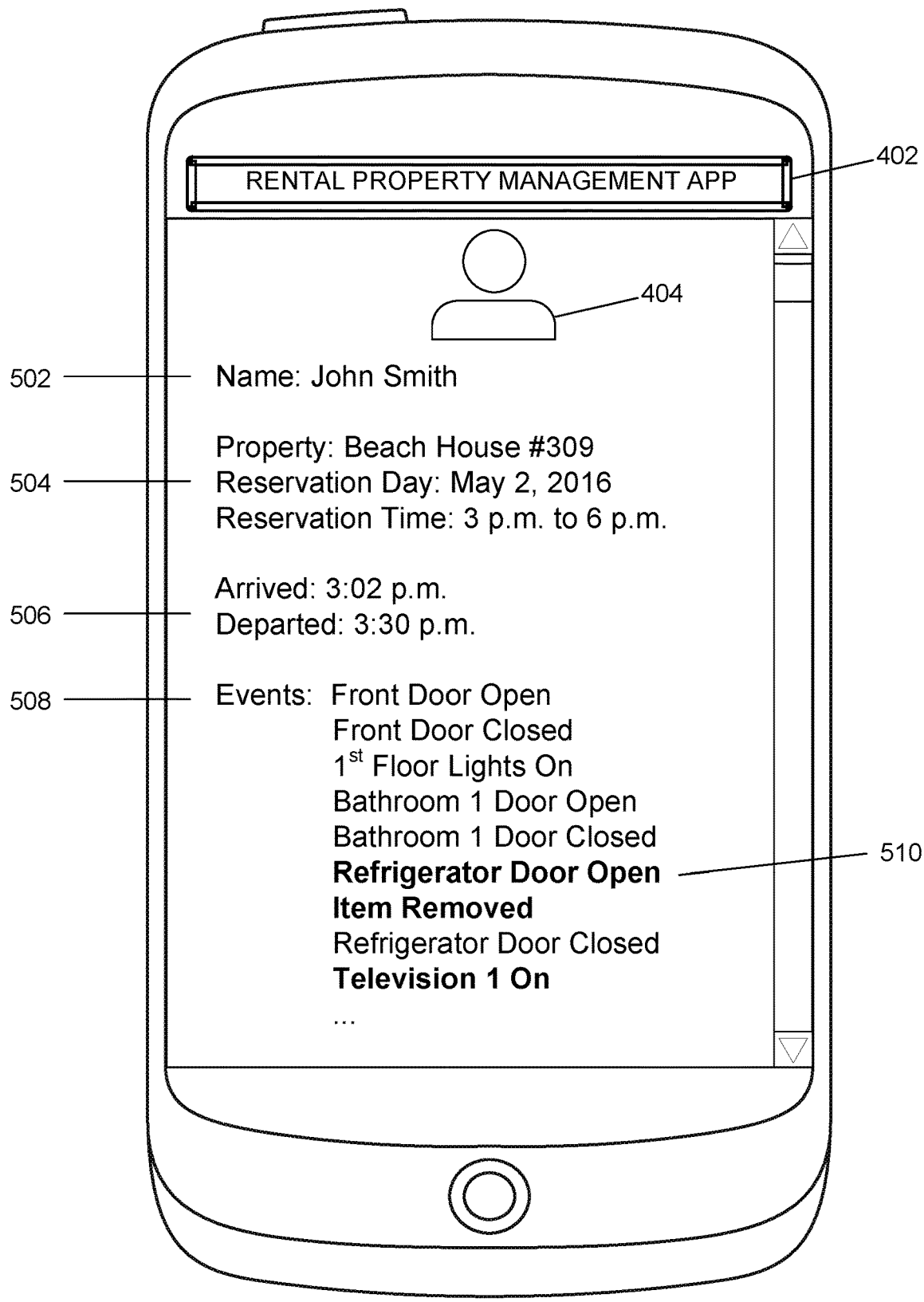

FIG. 5 illustrates a diagram of an example interface 500 for unattended property showing. The interface 500 includes a title 402, photo 404, prospective tenant name 502, reservation information 504, prospective tenant temporal data 506, events during the prospective tenant's visit 508, and flagged events 510. The interface 500 may be used by an owner or property manager of the property being shown. For example, the interface may be used by an owner or property manager of the property 101. The details shown by the interface 500 may relate to a prospective tenant, such as the individual near the front door 102 or the authorized user 104.

The prospective tenant name 502 may provide the user with the name of the person shown in the photo 404. In some examples, the prospective tenant name 502 may be selectable to view further details about the prospective tenant, such as a verified credit history, background check results, etc. In some examples, the interface 500 may include more or different prospective tenant information without requiring the user to navigate to a different interface.

The reservation information 504 may provide the user with information about the reservation made and the property viewed by the prospective tenant. For example, the address of a property, such as property 101, may be displayed. The date and time of the reservation may also be displayed. In some examples, all, some, or no elements of the reservation information 504 may be selectable to view more information about the elements. For example, a user may be able to select the property name or address to view details about the property, such as the square footage, number of rooms, etc. In some examples, the user may be able to select the date and/or time of the reservation to view details about that particular time. For example, the user may be able to select the reservation time period associated with the prospective tenant's visit and see details such as what other prospective tenants or people were at the property at the same time.

The prospective tenant temporal data 506 may provide the user with information about the time during which the prospective tenant was at the property 101. In some examples, the data 506 is determined from the prospective tenant's interactions with the electronic lock 128. In some examples, the data 506 is verified using data from other elements of the system 100, such as the sensors 122, the appliances 124, the cameras 126, and the server 130. For example, if Gary input the access code to the electronic lock 128 but left immediately after seeing the size of the kitchen without checking out with the electronic lock 128, the departure time may be determined using video data from the cameras 126, door sensor data from the sensors 122, etc.

The events during the prospective tenant's visit 508 may provide the user with information about the events that occurred while the prospective tenant was in the property. For example, elements of the system 100 may determine events for the property 101. Data from elements of the system 100 such as the sensors 122, the appliances 124, the cameras 126, and/or the server 130 may be used to detect events. For example, events such as doors opening or lights being turned on may be detected using the sensors 122. Events such as having an item removed from the refrigerator may be detected using the sensors 122, the appliances 124, such as the refrigerator itself, the cameras 126, etc.

In some examples, if more than one prospective tenant is visiting the property 101 at the same time, the elements of the system 100 may be able to detect which of the prospective tenants is associated with which events. For example, a television on event may be detected by the appliance 124 itself, but the event may be attributed to Kelly based on video data from the cameras 126. The prospective tenants with which the events are associated may be determined using various methods, such as GPS location, server 130 interaction, etc.

The flagged events 510 may highlight events of the events during the prospective tenant's visit 508. For example, events determined to be abnormal may be displayed in a visually different way. Events may be determined to be abnormal if they are events the owner or property manager does not wish to happen. For example, an item being removed from the refrigerator may be an abnormal event that is flagged. Events may be automatically determined to be abnormal by the system 100. For example, if an event such as a television on event has never occurred within the property 101 or any of the properties managed by an owner or property manager, the system 100 may determine the television on event to be abnormal and flag the event.

The interface 500 may further show information such as whether the prospective tenant indicated an interest in renting or buying the property. For example, if Ann decides that she wants to rent property 101, 1425 Otter Run, right after she views it, she may interact with the electronic lock 128 or another element of the system 100 to indicate her interest. This interest may be displayed within the interface 500. In some examples, the prospective tenant may provide no such indication, or may indicate negative interest. In some examples, these interests may be listed as an event in the list of events 508. In some examples, these interests may be indicated as separate elements of the interface 500.

In some examples, the owner or property manager of the property 101 may be able to select the element indicating the prospective tenant's interests, positive or negative, and perform an action. For example, the property manager may be able to approve the application of the prospective tenant if they have indicated positive interest and they have provided the necessary information. The property manager may be able to contact the prospective tenant through their provided contact information (if they have given permission to be contacted for such reasons) to ask for feedback and answer any questions the prospective tenant may have.

In some examples, the interface 500 may provide an alert to a remote user in real time. Alerts may be provided for flagged or abnormal events 510. Alert may indicate information such as occupancy information, electronic lock information, security footage, and response options. In some examples, the alert can be transmitted to the user device of an owner or property manager of the property.

For instance, after receiving the data from the electronic lock 128, the monitor control unit 110 may receive data gathered by the sensors 122, the appliances 124, and the cameras 126. The received data can include, for example, sensor data indicating occupancy information inside the property 101 at the time of the interaction with the electronic lock 128 (e.g., the number and identity of occupants within the property 101). In some implementations, the monitor control unit 110 aggregates the received data from the sensors 122, the appliances 124, and the cameras 126 based on using pattern recognition techniques in order to intelligently determine subsets of the received information to transmit to the rental property management server 130.

In an example, the alert may be transmitted as a text alert that indicates data gathered the devices within the property 101 (e.g., the sensors 122, the appliances 124, and the cameras 126) and aggregated by the monitor control unit 110. For instance, the electronic lock 128 may determine that motion detected within the detectable region 128*a* is suspicious movement based on analyzing information associated with the motion detected (e.g., time of detection, time period after the initially detecting input to the electronic lock 128, number of inputs to the electronic lock 128, types of motion detect, etc.). In addition, as described previously, the occupancy information can be used to determine the types of users that are inside the property 101 (e.g., children, adults, etc.).

Other arrangements and distribution of processing is possible and contemplated within the present disclosure.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method comprising:
  receiving, by a server and from a mobile device, a request for an unattended showing of a property by a user;
  determining, by the server, to schedule the unattended showing of the property by the user;
  based on determining, by the server, to schedule the unattended showing of the property by the user, providing, by the server, an access code to the mobile device in response to the request for the unattended showing of the property;
  receiving, by the server, an indication that a representation of the access code was received from the user by an electronic locking mechanism at the property; and
  based on receiving the indication that the representation of the access code was received from the user by the electronic locking mechanism at the property, providing, by the server, guided tour information and locking a portion of the property.

2. The method of claim 1, wherein based on receiving the indication that the representation of the access code was received from the user by the electronic locking mechanism at the property, providing, by the server, guided tour information comprises:
  initiating, by the server, a guided tour of the property.

3. The method of claim 1, wherein based on receiving the indication that the representation of the access code was received from the user by the electronic locking mechanism at the property, locking the portion of the property comprises:
  based on receiving the indication that the representation of the access code was received from the user by the electronic locking mechanism at the property, locking a closet.

4. The method of claim 1, comprising:
  determining that the user has departed the property; and
  based on determining that the user has departed the property, unlocking the portion of the property.

5. The method of claim 1, comprising:
  determining that the user has stayed at the property past a time reserved for the unattended showing, wherein the unattended showing represents the user viewing the property unaccompanied by an owner of the property; and based on determining that the user has stayed at the property past a time reserved for the unattended showing, providing, by the server, notification that the user has stayed at the property past the time reserved for the unattended showing.

6. The method of claim 1, comprising:
determining that the user is approaching an end of a time reserved for the unattended showing; and
based on determining that the user is approaching the end of the time reserved for the unattended showing, providing, by the server, notification that the user is approaching the end of the time reserved for the unattended showing.

7. A system comprising:
one or more computers and one or more storage devices storing instructions that are operable, when executed by the one or more computers, to cause the one or more computers to perform operations comprising:
receiving, by a server and from a mobile device, a request for an unattended showing of a property by a user;
determining, by the server, to schedule the unattended showing of the property by the user;
based on determining, by the server, to schedule the unattended showing of the property by the user, providing, by the server, an access code to the mobile device in response to the request for the unattended showing of the property;
receiving, by the server, an indication that a representation of the access code was received from the user by an electronic locking mechanism at the property; and
based on receiving the indication that the representation of the access code was received from the user by the electronic locking mechanism at the property, providing, by the server, guided tour information and locking a portion of the property.

8. The system of claim 7, wherein based on receiving the indication that the representation of the access code was received from the user by the electronic locking mechanism at the property, providing, by the server, guided tour information comprises:
initiating, by the server, a guided tour of the property.

9. The method of claim 1, wherein based on receiving the indication that the representation of the access code was received from the user by the electronic locking mechanism at the property, providing, by the server, guided tour information comprises:
triggering, by the server, an audible personalized greeting to the user.

10. The system of claim 7, wherein based on receiving the indication that the representation of the access code was received from the user by the electronic locking mechanism at the property, locking the portion of the property comprises:
based on receiving the indication that the representation of the access code was received from the user by the electronic locking mechanism at the property, locking a closet.

11. The system of claim 7, the operations comprising:
determining that the user has departed the property; and
based on determining that the user has departed the property, unlocking the portion of the property.

12. The system of claim 7, the operations comprising:
determining that the user has stayed at the property past a time reserved for the unattended showing, wherein the unattended showing represents the user viewing the property unaccompanied by an owner of the property; and
based on determining that the user has stayed at the property past a time reserved for the unattended showing, providing, by the server, notification that the user has stayed at the property past the time reserved for the unattended showing.

13. The system of claim 7, the operations comprising:
determining that the user is approaching an end of a time reserved for the unattended showing; and
based on determining that the user is approaching the end of the time reserved for the unattended showing, providing, by the server, notification that the user is approaching the end of the time reserved for the unattended showing.

14. A non-transitory computer-readable medium storing software comprising instructions executable by one or more computers which, upon such execution, cause the one or more computers to perform operations comprising:
receiving, by a server and from a mobile device, a request for an unattended showing of a property by a user;
determining, by the server, to schedule the unattended showing of the property by the user;
based on determining, by the server, to schedule the unattended showing of the property by the user, providing, by the server, an access code to the mobile device in response to the request for the unattended showing of the property;
receiving, by the server, an indication that a representation of the access code was received from the user by an electronic locking mechanism at the property; and
based on receiving the indication that the representation of the access code was received from the user by the electronic locking mechanism at the property, providing, by the server, guided tour information and locking a portion of the property.

15. The medium of claim 14, wherein based on receiving the indication that the representation of the access code was received from the user by the electronic locking mechanism at the property, providing, by the server, guided tour information comprises:
initiating, by the server, a guided tour of the property.

16. The medium of claim 14, the operations comprising based on receiving the indication that the representation of the access code was received from the user by the electronic locking mechanism at the property, locking a portion of the property.

* * * * *